(12) United States Patent
Witchey et al.

(10) Patent No.: US 12,462,246 B1
(45) Date of Patent: Nov. 4, 2025

(54) TOKEN-BASED DIGITAL PRIVATE DATA EXCHANGE SYSTEMS, METHODS, AND APPARATUS

(71) Applicant: Nant Holdings IP, LLC, Culver City, CA (US)

(72) Inventors: Nicholas J. Witchey, Laguna Hills, CA (US); Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 17/590,291

(22) Filed: Feb. 1, 2022

Related U.S. Application Data

(60) Provisional application No. 63/302,484, filed on Jan. 24, 2022.

(51) Int. Cl.
G06Q 20/36 (2012.01)
G06Q 20/38 (2012.01)
G06Q 20/40 (2012.01)
H04L 9/00 (2022.01)
H04L 9/32 (2006.01)

(52) U.S. Cl.
CPC ..... *G06Q 20/3674* (2013.01); *G06Q 20/3672* (2013.01); *G06Q 20/3678* (2013.01); *G06Q 20/38215* (2013.01); *G06Q 20/3829* (2013.01); *G06Q 20/401* (2013.01); *H04L 9/008* (2013.01); *H04L 9/3213* (2013.01); *G06Q 2220/10* (2013.01); *H04L 2209/603* (2013.01)

(58) Field of Classification Search
CPC ........ G06Q 20/3674; G06Q 20/00–425; H04L 9/00–50
USPC ................................................. 705/50, 330
See application file for complete search history.

(56) References Cited

U.S. PATENT DOCUMENTS 8,752,203 B2 * 6/2014 Reinertsen .............. G06F 21/34
726/28
11,025,598 B1 6/2021 Laghaeian et al.
(Continued)

FOREIGN PATENT DOCUMENTS

CA 2949449 11/2015
EP 3408987 B1 11/2019
(Continued)

OTHER PUBLICATIONS

U.S. Appl. No. 18/100,544, "Non-Final Office Action," dated Dec. 11, 2023, 27 pages.
(Continued)

*Primary Examiner* — Ari Shahabi
(74) *Attorney, Agent, or Firm* — Kilpatrick Townsend & Stockton LLP

(57) ABSTRACT

Systems, apparatus, and methods of managing access to private data via tokens are disclosed. The disclosed techniques provide for constructing digital tokens that represent a right-to-access private data where the tokens can be managed as individual objects. Further, such digital access tokens (DATs) can be recorded on a notarized ledger, a blockchain for example. Additionally, the rights-to-access can be embodied as a non-fungible token (NFT), which could further include support for establishing homomorphic encryption workspaces in which private data can be accessed or manipulated without exposing the private data.

29 Claims, 4 Drawing Sheets

(56) References Cited

U.S. PATENT DOCUMENTS

| | | | |
|---|---|---|---|
| 11,062,006 | B2 | 7/2021 | Maxwell et al. |
| 11,070,378 | B1 | 7/2021 | Griffin et al. |
| 11,210,383 | B2 | 12/2021 | Witchey et al. |
| 2005/0177716 | A1* | 8/2005 | Ginter .................. G06T 1/0021 713/157 |
| 2017/0223005 | A1 | 8/2017 | Birgisson et al. |
| 2019/0294817 | A1* | 9/2019 | Hennebert ............ H04L 9/0861 |
| 2020/0160320 | A1 | 5/2020 | Williams et al. |
| 2020/0211002 | A1* | 7/2020 | Steinberg ............. G06Q 20/385 |
| 2020/0273048 | A1* | 8/2020 | Andon .................. G06Q 10/02 |
| 2020/0374129 | A1* | 11/2020 | Dilles .................. H04L 9/3273 |
| 2021/0097202 | A1* | 4/2021 | Datta ...................... G06F 21/36 |
| 2021/0097508 | A1 | 4/2021 | Papanikolas |
| 2021/0232707 | A1 | 7/2021 | Wilson et al. |
| 2022/0029969 | A1* | 1/2022 | Kravitz ................. H04L 9/3252 |
| 2022/0337392 | A1* | 10/2022 | Schauer ................ H04L 9/3247 |
| 2023/0123579 | A1* | 4/2023 | Panikkar ............... H04L 9/0822 713/189 |
| 2023/0205896 | A1* | 6/2023 | Bridges ............... G06F 21/6218 713/193 |

FOREIGN PATENT DOCUMENTS

| | | | | |
|---|---|---|---|---|
| EP | 3832975 | A1 | 6/2021 | |
| EP | 3851984 | A1 | 7/2021 | |
| WO | 2017/042375 | A1 | 3/2017 | |
| WO | 2017/042400 | A1 | 3/2017 | |
| WO | 2020/146667 | A1 | 7/2020 | |
| WO | 2021/102116 | A1 | 5/2021 | |
| WO | WO-2021255425 | A1 * | 12/2021 | ........... G06F 16/252 |

OTHER PUBLICATIONS

U.S. Appl. No. 18/100,544, "Final Office Action," dated Jun. 14, 2023, 19 pages.
U.S. Appl. No. 18/100,544, "Non-Final Office Action," dated Mar. 28, 2023, 15 pages.
"How Scientists Are Embracing NFTs," Jun. 18, 2021, Nature.com, 11 pages.
Howard, "Where is my art stored when it'sreleased through Foundation? An IPFS primer," Aug. 30, 2021, intercom.help, 3 pages.
Sergeenkov, "How to Mint an NFT," published May 12, 2021, coinmarketcap.com, 10 pages.
"Token Program," Oct. 11, 2021, Solana Program Library Docs, spl.solana.com, 25 pages.
Cvllr, "Solidity Tutorial: all about Addresses," Aug. 1, 2019, jeancvllr.medium.com, 27 pages.
"Tutorial: mint and transferyour own ERC-721 (NFT) tokens," Oct. 12, 2021, docs.secondstate.io, 10 pages.
Wilhelm, "Bring on the low-cost NFTs," Nov. 3, 2021, techcrunch.com, 9 pages.
"Layer2 Rollups," Dec. 3, 2021, ethereum.org, 11 pages.
Vogelsteller, et al., "EIP-20: Token Standard," Aug. 27, 2021, eip.ethereum.org, 4 pages.
Reitweßner, et al., "EIP-165: Standard Interface Detection," Aug. 30, 2021, eips.ethereum.org, 8 pages.
Entriken, et al., "EIP-721: ERC-721 Non-Fungible Token Standard," Aug. 4, 2021, eips.ethereum.org, 14 pages.
Lockyer, et al., "EIP-998: ERC-998 Composable Non-Fungible Token Standard," Oct. 13, 2021, eips.ethereum.org, 35 pages.
Radomski, et al., "EIP-1155: ERC-1155 Multi Token Standard," Aug. 4, 2021, eips.ethereum.org, 22 pages.
"Smart Contract Languages," Aug. 4, 2021, ethereum.org, 10 pages.
Gorantala, et al., "A General Purpose Transpiler for Fully Homomorphic Encryption,"fhe-open-source@google.com, Jun. 4, 2021, 10 pages.
"Introduction to Smart Contracts," Aug. 30, 2021, ethereum.org, 6 pages.
Jones, et al., "JSON Web Token (JWT)," Internet Engineering Task Force (IETF), Standards Track, May 2015, 30 pages.
"Security Requirements For Cryptographic Modules," National Institute of Standards and Technology, FIPS PUB 140-2, May 25, 2001, 69 pages.
Jones, et al., "The OAuth 2.0 Authorization Framework Bearer Token Usage," Standards Track, Oct. 2012, 18 pages.
"Distributed Monitoring with OpenNMS," OpenNMS, 14 pages.
Polyakov, et al., "Palisade Lattice Cryptography Library User Manual (v1.11.4)," Aug. 20, 2021, 53 pages.
Oracles, "What is an Oracle," Jul. 9, 2021, ethereum.org, 9 pages.
U.S. Appl. No. 18/100,544, "Final Office Action," dated Apr. 17, 2024, 30 pages.
U.S. Appl. No. 18/100,544, "Non-Final Office Action," dated Jul. 25, 2024, 25 pages.
U.S. Appl. No. 18/100,544, "Final Office Action," dated Nov. 14, 2024, 30 pages.
U.S. Appl. No. 18/100,544, "Non-Final Office Action," dated Feb. 20, 2025, 30 pages.
U.S. Appl. No. 18/100,544, "Notice of Allowance," dated May 30, 2025, 9 pages.

* cited by examiner

TOKEN-BASED DIGITAL PRIVATE DATA EXCHANGE SYSTEMS, METHODS, AND APPARATUS

CROSS-REFERENCE TO RELATED APPLICATION

This application claims the benefit of U.S. Provisional Application No. 63/302,484, filed Jan. 24, 2022, which is hereby incorporated by reference in its entirety for all purposes.

FIELD OF THE INVENTION

The field of the invention is computer-based private digital data exchange technologies leveraging tokens.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

By way of introduction, a blockchain represents blocks of data that are linked together via cryptography technology. Each block includes, among other things, data and a cryptographic hash of a previous block. The cryptographic hash serves as a link to the previous block. As such, the blocks form a chain of blocks (e.g., a blockchain) linked via cryptographic hash. The data in each block is secured (e.g., against unauthorized modifications, etc.) because any change alters all subsequent blocks. Generally, a distributed computing architecture is used to manage the blockchain. This architecture can involve multiple computer nodes. Each computer node can store a block of the blockchain, and the computer nodes implement one or more protocols to communicate and validate blocks.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or units of, for example, data used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be understood that many of the foundational technical features provided in the following specification are presented to enable compact examination of the disclosed inventive subject matter. While some of the foundational technical features described herein may seem obscure, in many cases such features may be considered within the scope of understanding of one skilled in the art. Thus, presentation of such background technologies should not be considered limiting.

SUMMARY

The inventive subject matter provides apparatus, systems and methods in which private digital data may be accessed or otherwise managed via one or more digital access tokens (DATs) via which data owners retain control over their private data while also permitting others to access the data owner's private data.

One aspect of the inventive subject matter includes computer-based data exchange systems. Such systems can include at least one non-transitory computer-readable memory (e.g., SSD, RAM, Flash, HDD, FPGA, PLA, ROM, etc.) storing a suite of one or more sets of software instructions that provide DAT management functionality. Systems can further include one or more private databases where the databases store private data records. In some scenarios, the private data records can comprise one or more field—value entries where the "field" may indicate a type of data and the "value" represents the actual data value for the field type (e.g., "name": "John Doe", "Zipcode": "90210", etc.). Each private data record may be associated with one or more authorized entities, possibly the data owner, that may have authority to provide authorization or permission to others to access the private data. Contemplated systems further include one or more processors (e.g., CPUs, GPUs, multi-core processors, RISC processors, ASICS, FPGAs, PLAs, etc.) coupled with the private database as well as the memory. The processors, or cores, perform various operations upon execution of the software instructions that provide for accessing or interacting with the private data via DATs. For example, the processor may receive, over a network, one or more requests for access to the private data. The request may originate from one or more requestor devices (e.g., cell phone, tablet, computer, web browser, cloud or virtualized computer, etc.). The request may typically include an indication of which fields of the private data may be of interest to the requestor. In response to the request and upon any other required criteria or conditions, the processor generates a DAT based on information relating to the requestor and on an authorization identifier of the authorized entity associated with the private data. Further, the DAT may include various digital data that enable or cause a device to access the private data or private data values, including for example a data access activation protocol (DAAP). A DAAP represents digitally encoded information (e.g., code, scripts, APIs, software instructions, implementations of algorithms, metadata, etc.) by which the requestor device many activate access or interact with the private data values. Still further, the DAT may be implemented as a non-fungible token (NFT), a bearer token, a token set, or combination of token types. In more preferred embodiments, DATs may become owned by a token owner, likely an entity other than the authorization entity. Once the DAT is properly instantiated, the DAT or its associated operation may be stored on or linked to a record-keeping system (e.g., a notarized ledger, such as a distributed, smart contract, and/or an immutable ledger, a blockchain, a hashgraph, etc.). After creation of the DAT and its DAAP, the token owner may use the information in the DAAP to gain access to the requested private data. Thus, the processor may authenticate the owner of the DAT by referring to the DAT, possibly on the record-keeping system or validating the owner based on the owner's identifier and a corresponding token identifier of the DAT. After authentication, the processor further enables the token owner to access the private data via the DAAP. In some embodiments, the DAAP may include a homomorphic workspace context via which the token owner may refer to or operate on values of the private data without having access to the private data itself. Such an approach provides for an entity to remain in control over their owner private data records while providing DATs that permit access to the private data in an authorized and auditable manner.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
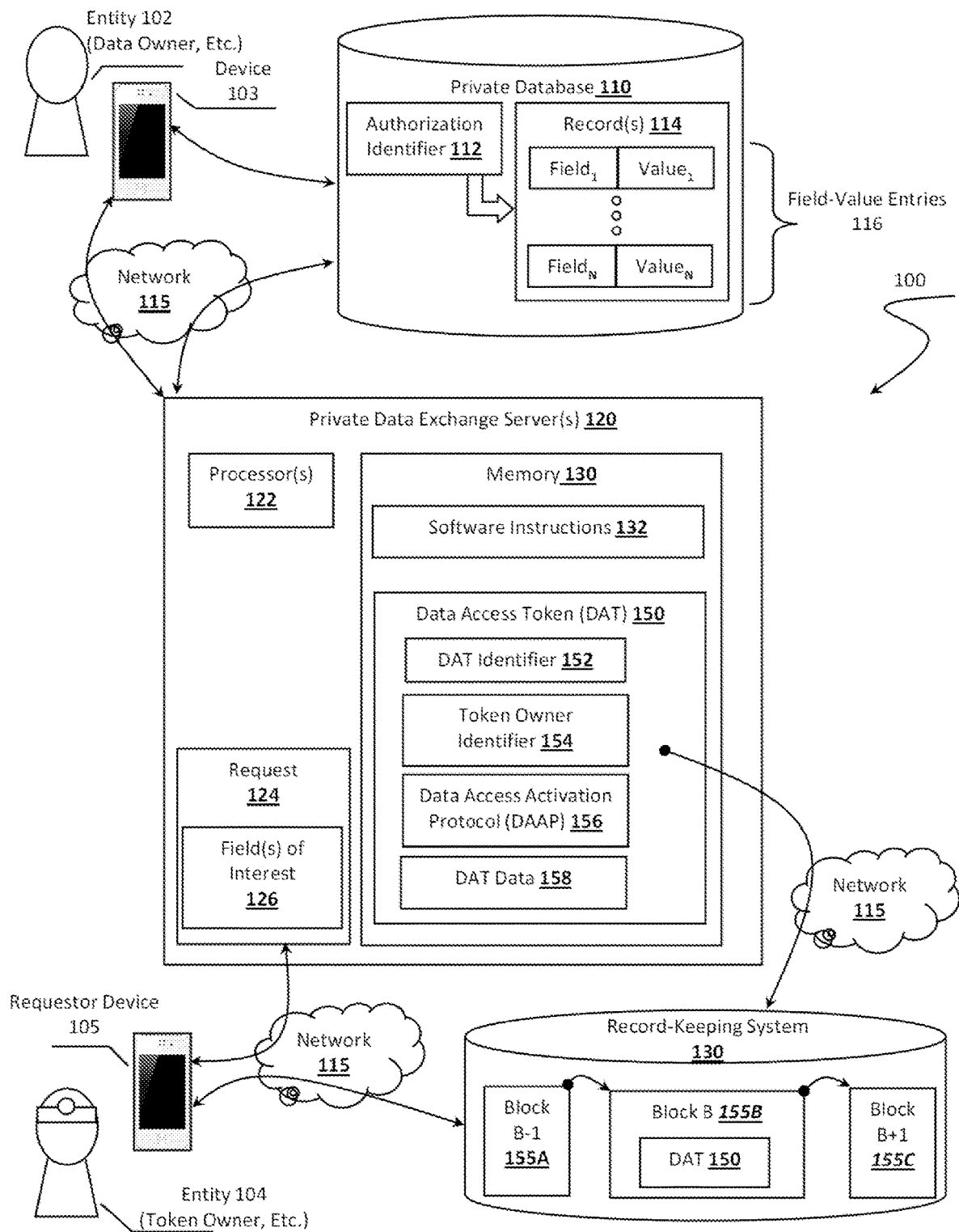
FIG. 1 illustrates a schematic of a private digital data exchange system using data access tokens (DATs) stored on a record-keeping system.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise at least one processor configured to execute software instructions stored on a tangible, non-transitory computer-readable storage medium (e.g., hard drive, FPGA, PLA, solid state drive, RAM, flash, ROM, etc.). The software instructions or suite of software instructions configure or program the computing device or their processors to provide the roles, responsibilities, or other functionality as discussed below with respect to the disclosed apparatus or systems. Further, the disclosed technologies can be embodied as a computer program product that includes a non-transitory computer-readable medium storing the software instructions or a suite of software instructions that cause one or more processors to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, TCP, UDP, FTP, SNMP, IP, AES, public-private key exchanges, web service or RESTful APIs, known financial operation protocols, or other electronic information exchanging methods. Data exchanges among devices can be conducted over a packet-switched network, the Internet, LAN, WAN, VPN, or other type of packet switched network; a circuit switched network; cell switched network; or other type of network, wired or wireless.

As used in the description herein and throughout the claims that follow, when a system, engine, server, agent, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory. It should be appreciated the combination of software and hardware working in concert create a dedicated set of physical, real-world structures that provide utility to one or more users that would not exist outside the scope of the physical, real-world assets.

One should appreciate that the disclosed techniques provide many advantageous technical effects including physically protecting digital data from unauthorized access while also ensuring those who own the data retain control over the digital data and those who have access rights to the digital data may retain access. This is achieved by the disclosed technology's ability to separate digital data ownership from rights-to-access as embodied by a DAT. Further, the disclosed data structures, protocols, or other techniques form a computer-based infrastructure capable of storing, securing, retrieving, authenticating, validation or otherwise managing digital access rights in the form of distinct digital tokens, possibly in an immutable fashion, via the described record keeping systems.

The focus of the disclosed inventive subject matter is to enable construction or configuration of a computing device to operate on vast quantities of digital data, beyond the capabilities of a human. Although the digital data described herein represent various real-world elements, it should be appreciated that the digital data is a representation of one or more digital models. By instantiation of such digital models, data structures, tokens, or other digital constructs in the memory of the computing devices, the computing devices can manage the digital data or models in a manner that provides utility to a user of the computing device that the user would lack without such a tool. For example, a user would ordinarily lack the ability to control or manage their own private digital data across a myriad of computers unless provided with a computer-based system that enables them to retain control of their private digital data.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Various embodiments of this disclosure are described herein. Variations of those embodiments may become apparent to a person having skill in in the art upon reading the foregoing description. Accordingly, this disclosure includes all modifications and equivalents of the subject matter recited in the claims appended hereto.

Furthermore, all references cited herein are hereby incorporated by reference to the same extent as if each reference were individually and specifically indicated to be incorporated by reference and were set forth in its entirety herein.

A brief introduction to non-fungible tokens may be of use. The inventive subject matter, in some embodiments, leverages a decentralized web technology (e.g., Web3) called non-fungible tokens (NFTs). NFT technologies are built on similar technologies as record-keeping systems of fungible tokens that are equivalent to each other, where NFTs represent single tokens that are unique. Rather than representing the data itself, NFTs typically represent an exchange related to the data. Thus, NFTs can be considered, in many cases, an indirect representation of the data. Still, the data associated with an NFT may be stored off a record-keeping system to be accessed by the owner of the NFT. Additional information associated with NFTs can be found here at the following URL: en.wikipedia.org/wiki/Non-fungible_token.

NFTs can be created (i.e., typically called "minting"), exchanged, burned, or otherwise managed as digital objects, typically via transactions related to the NFTs. Management of NFTs can be achieved through use of existing token standards such as via Ethereum smart contract standards. These standards include ERC-20, which represents fungible tokens; ERC-721 defines interfaces by which one may manage NFTs (according to ERC-721, NFT minting, transfers, burning, or other operations are recorded on the Ethereum blockchain to retain a record-keeping system of all desired actions associated with the NFT); ERC-998 defines interfaces for creating tokens comprising sub tokens and vice versa; and yet further, ERC-1155 defines interfaces by which one can create token sets. As individuals interact with Ethereum tokens via one or more transactions (or, more generally, operations), the transactions (operations) are recorded on the Ethereum blockchain thereby forming a record-keeping system of the existence of such tokens in an immutable manner.

The inventive subject matter presented below uses such tokens, including NFTs, in a novel and new way. More specifically, tokens can be used to represent a right-to-access private data. The advantage of the disclosed approach is many-fold. For example, by using NFTs or other types of record-keeping system-based tokens as a right-to-access token, private data values can be kept private while also ensuring that a third-party entity is able to retain their rights to access the data at a later date, possibly via an escrow service. Further, data owners, even individuals, will be able to monitor or even gain from exchanges associated with the right-to-access tokens, including any transfers to other entities. Still further, by abstracting the right-to-access as a token, greater control of the interactions with the data may be achieved by enabling fine grained control of how the token may be used (e.g., number of uses, enforced restrictions, etc.). Additional details regarding use of such tokens will be discussed in the context of the inventive subject matter below.

FIG. 1 provides an overview of contemplated token-based private data exchange system 100 where entity 102, a data owner, may grant permission via one or more tokens, to entity 104, who may become the owner of the token. In the example shown, private data exchange server 120 brokers permissions to access private data in private database 110. Sever 120 may operate between entity 102 and entity 104 to broker permissions via execution of software instructions 132 stored in at least one non-transitory, computer-readable memory 130 on at least one processor 122.

System includes one or more of private database 110, which comprises a computing device configured to store private data, records 114 for example. Records 114 are considered private in the sense that unauthorized entities are prohibited from accessing records 114 without permission from the owner or authorized entity associated with records 114; entity 102 in the example shown. Private database 110 can comprise any practical form of indexed datastore where records 114 may be retrieved based on the underlying index schema. Example datastores that can operate as private database 110 can include relational databases, SQL databases, file systems, look-up tables, hash tables, indexed data structures, trees, or other forms of indexed data structures. Suitable commercial databases can include Microsoft Access, MySQL, PostgreSQL, MongoDB, MariaDB, CockroachDB, or Neo4j, just to name a few.

Records 114 can comprise one or more of field-value pairs 116 that represent the core private data of records 114. While records 114 can also comprise non-private data, for the purposes of discussion it may be assumed that field-value pairs 116 are to be kept under management for privacy concerns. The field portion of field-value pairs 116 represents a type of data or name of the field. For example, the field portion may be "Name," "Zipcode," or other generic terms indicating the nature of the field. As such, the field portion may not necessarily be private per se as discussed further below. However, the corresponding value portion is considered a private data value that is not to be shared unless authorized by entity 102. Records 114 can be implemented in a manner that is suitable to the corresponding database schema. For example, records 114 can comprise N-tuples having a collection of attribute-value pairs. Further records 114 can comprise one or more nested objects, possibly stored as JSON objects in MongoDB. Further, a field portion of record 114 could comprise one or more sub-objects that are themselves field-value pairs; for example, an address field having a value comprising sub-address fields. Additionally, field-value pairs 116 could be implemented a "key" and corresponding "value," tabular form, or other suitable indexing schema. Still further, records 114 or even field-value pairs 116 can be tagged with metadata that is not necessarily private, but can aid in management of records 114. Example metadata could include timestamps associated with data creation updates, permission levels, authorized entity, security clearance, keywords or attributes, costs or fees associated with interacting with records 114, or other types of metadata that might not directly relate to private information.

Generally, entity 102 can own, obtain, process, or manage private data related to entity 102 or to another entity (e.g., to a customer of entity 102, an end user of a service provided by entity 102, etc.), where this data is private and/or sensitive in nature and is to be secured against unauthorized access. While entity 102 is illustrated as a person, it should be appreciated that entity 102 interacts with system 100 via one or more devices as indicated by device 103. Thus, entity 102 could be represented in system 100 by corresponding computing devices including servers, client devices, browsers, mobile phones, tablet computers, phablets, smart appliances, expert systems, or other types of devices. Thus, in some embodiments, entity 102 might not have direct access to the computing systems that house records 114 and thus require computer device 103 to control records 114.

Typically, entity 102 is represented in the system via one or more of authorization identifiers 112, by which the system can recognize entity 102. Authorization identifier 112 can be single valued or multivalued depending on the desired implementation. For example, in some embodiments including those associated with using digital tokens, authorization identifier 112 can comprise an address associated with the corresponding record-keeping system technology; a uint256 (i.e., a 256-bit unsigned integer) address in Ethereum for example, which may also represent an account management utility that stores cryptographic keys in support of network-based operations (e.g., a crypto-purposed wallet), a public key, or other reference to entity 102. Other record-keeping system technologies can use different identifiers. For example, a Hedera hashgraph account management utility is in the form of a triplet x.y.z where x is a shard number (shardID; typically 0 at the time of this writing), y is a realm number (realmID; also typically 0 at the time of this writing), and z is a public key. Still, authorization identifier 112 can also include other record-keeping system identifiers, usernames, passwords, multi-factor authentication identifiers, or other features without departing from the scope of the inventive subject matter.

While entity 102 represents an entity that owns records 114 or is authorized to access or otherwise interact with records 114, entity 104 is not a priori authorized to access records 114. However, entity 104 may have a need or a desire to access records 114. To address the needs of entity 104 while also protecting the property rights or privacy of entity 102 (e.g., the owner of the private data or the user associated with the values shown in the private data, etc.) private data exchange server 120 can operate as an intermediary between the entities to broker access to records 114. In the example shown, entity 104 transmits request 124 over network 115 from a requestor device 105 to private data exchange server 120. Request 124 includes one or more fields of interest 126 related to the fields in records 114. In response, private data exchanges server 120 causes one or more data access tokens (DATs) 150 to be instantiated or otherwise generated, possibly upon any required authorization of entity 102. Entity 104 may then become the token owner of DAT 150 and may also use DAT 150 to access the private data values corresponding to fields of interest 126.

Entity 104 makes their request via one or more of requestor device 105, which is shown as a cell phone or mobile device. Still, requestor device 105 can comprise any practical computing device with suitable software including a dedicated appliance, a desktop computer, a tablet, a medical device, an expert system, a database server, or other type of computing device. More specifically, requestor device 105 can operate as a client of private data exchange server 120. One should appreciate the need for requestor device 105. In view of the fact that the private data is most likely stored in a non-human readable format on a remote computing system, the requestor device may be required to properly interface with the remote computing system and possibly to convert the data into a human understandable form.

Although network 115 is represented euphemistically as a cloud in FIG. 1, one should appreciate network 115 can include a wide range of networking infrastructures, possibly combined together to form network 115. In more typical embodiments, network 115 comprises at least the Internet using known communication protocols (e.g., HTTP, TCP, UDP, IPv4, IPV6, etc.). Still, network 115 could also comprise other types of networks including LANs, WANs, personal area networks (PANs), VPNs, private networks, public networks, wireless networks, or other types of network without departing from the inventive subject matter.

Private data exchange server 120, as referenced above, represents one or more computing devices operating as an intermediary (e.g., broker, proxy, etc.) between requestor device 105 and private database 110. In more typical embodiments, server 120 comprises a web-based computing platform that is accessible via network 115. For example, the services provided by server 120 could be built on Amazon Web Services, Google Cloud, IBM Watson or cloud services, Microsoft Azure, or other similar cloud computing services. Still, in some embodiments, server 120 can comprise a proprietary computing system that includes one or more of processor 122 and one or more of non-transitory computer-readable memory 130. While server 120 can operate as a cloud-base service, it may also function on a single computing device. Memory 130 is illustrated as storing one or more sets of software instructions 132, which provide the services described herein when executed by processors 122. Furthermore, although FIG. 1 illustrates a distributed architecture where device 103, database 110, server 120, requester device 104, and record-keeping system are implemented as separate computing components, a different architecture may be used, where some or all of such computing components can be combined and/or embodied in a single computing resource. For instance, device 103 and server 120 can be implemented as a computing component (e.g., a set of hardware configured with software instructions) operated by the same entity. Additionally, or alternatively, private database 110 and server 120 can be implemented as a computing component operated by the same entity. Additionally, or alternatively, server 120 and a computing node that provides record-keeping system functionalities can be implemented as a computing component operated by the same entity. Additionally, or alternatively, requestor device 105 and server 120 can be implemented as a computing component operated by the same entity.

In some embodiments, entity 104 or requestor device 105 could a priori be aware of which fields of records 114 might or might not be accessible. In such scenarios, requestor device 105 could comprise a listing of available fields, refer to a database standard outlining available fields, or other information. In this case, requestor device can construct request 124 by provisioning it with one or more of fields of interest 126. One should note request 124 does not necessarily require all available fields, but rather can include just specific fields. Thus, request 124 could be provisioned with one field of interest, 10 fields, 100 fields, 10000 fields, or more.

Still, entity 104 or requestor device 105 might not a priori be aware of which fields of records 114 could be accessed, and, therefore, could not properly formulate request 124 without first gaining such information. Thus, in such embodiments, there is a need for a technique by which entity 104 or requestor device 105 can determine or discover sufficient information to properly formulate request 124. For example, server 120 can be provisioned with one or more APIs (e.g., RPCs, RESTful APIs, proprietary protocols, etc.) through which requestor device 105 can interact with server 120 or private database 110 to at least determine which fields of records 114 could be available. Again, not all fields may be accessible. Rather, server 120 or database 110 may exclude or restrict access to some fields. Thus, through calling the APIs, requestor device 105 can discover which fields are available or rather which private data values of fields are available for access. For example, field-value entries 116, records 114, or other data objects can comprise various metadata information that outlines the nature of the objects (e.g., attributes, keywords, tags, ontological structures, namespaces, etc.). Requestor device 105 can then use the metadata information to query server 120 or database 110 to discover which fields could be available (e.g., request all to fields for individuals with certain characteristics, request fields having specific time stamps, etc.).

Regardless of how requestor device 105 obtains sufficient information of which fields have accessible private data values, request 124 can include any practical number of fields of interest 126. Consider an example where entity 104 wishes to build a machine learning training data set. For such a machine learning task, private data values from a large cohort might be necessary where the cohort comprises 1,000; 10,000; 100,000 or more entities. Requestor device 105 can construct or otherwise provision request 124 with the information outlining the task's field requirements (e.g., entity data, number of entities, time requirements, waveforms, vital signs, demographics, metadata, etc.). Request 124 can be submitted through a client agent running on requestor device 105, through invocation of APIs on private data server 120, through constructing a JSON or other markup language structure and sending to server 120, or through other techniques. Server 120 can then refer to, if necessary, private database 110 by forwarding request 124 to database 110 or by reformatting the request as a query that database 110 can understand (e.g., SQL, DQLs, keywords, etc.) to see if request 124 or at least a portion of request 124 may be fulfilled. When private data server 120 has sufficient information to respond to request 124, server 120 can transmit a response back to requestor device 105, possibly outlining the extent of which it is able to service the cohort request. The response could comprise one or more messages regarding the request. For example, the response could comprise a SUCCESS message indicating the request can be serviced, an ACK message indicating the request has been received but not yet processed which could also include an estimated time to complete, a COMPLETE message indicating the request has been completed, a FAILED message indicating the request cannot be serviced, or other messages to ensure requestor device 105 can properly handle the state of request 124. One should appreciate that such messages or protocols executed by requestor device 105 and server 120 can be simple or as complex as necessary. For a request for such a large number of fields of interest, server 120 could respond with a message indicating how much of the request may be serviced, say only 5000 fields are available of the 10000 fields requested. Further, server 120 could also construct an internal task that periodically monitors how much data is available on database 110 to service request 124. When the task is run, it can report back to requestor device 105 (e.g., via a push message, via a pull message, etc.) the status of the request or via updating a corresponding smart contract or oracle associated with a data access token (DAT). Thus, if request 124 could be fulfilled eventually, it can be converted to a monitoring task. Smart contracts and oracles are discussed further below. By providing details regarding the serviceability of request 124, requestor device 105 can then determine how best to construct a new request, terminate existing pending requests, or other managing requests.

Under the assumption request 124 can be fulfilled, server 120 constructs or otherwise instantiates data access token (DAT) 150 in memory 130. DAT 150 represents the right-to-access or permission to access the private data values associated with fields of interest 126 and does not necessarily include the actual private data values associated with fields of interest 126. In the example shown, entity 102 operates as an authorization entity that grants the right to access or permissions to access the private data values of fields of interest 126. These access rights are granted to entity 104, which would be the token owner. Thus, it should be appreciated the disclosed system provides for creating a chain of custody of these access rights as embodied by DAT 150. As the owner of DAT 150 transfers ownership of DAT 150 to a new owner, the chain of custody grows and is evidenced by recording the transfer exchanges on the corresponding record-keeping system 130. Still, in some embodiments, DAT 150 could be limited to a single owner and may be exclusive, restricted, or otherwise precluded from being transferred to a new owner as enforced by the underlying smart contract used to govern DAT 150. DAT 150 can also indicate or define ownership thereto across multiple dimensions. The dimensions include entities, time, type of access, or the like. For instance, DAT 150 can indicate ownership by an entity over a period of time, where this ownership is automatically terminated after expiration of the period of time, or possibly transferred to a new owner (e.g., original data owner, a designated next owner, etc.). DAT 150 can also indicate ownership by a first entity over a first period of time and ownership by a second entity over a second period of time. The two periods of time may be the same or may be different. If different, the two periods of time may but need not overlap or be contiguous. Further, DAT 150 can indicate that an ownership is valid for a number times the private data can be accessed and is terminated after that number is reached. Additionally, or alternatively, DAT 150 can indicate that a first ownership can be valid as long as the number of times has not been reached, while also indicating that a second ownership is valid for a period of time. DAT 150 can also indicate an authorized rate of access (e.g., number of times the private data can be accessed within a period of time). Further, there is no requirement for a one-to-one relationship between request 124 and DAT 150. A single request could generate one or more of DAT 150. For example, if request 124 includes a request for 1,000s of entities, it is possible private data exchange server 120 could generate 1,000s of DAT 150, one for each entity that grants permission. Alternatively, many requests could generate a single DAT 150 representing aggregated requests. For example, an entity could make individual requests for each entity's private data and, upon obtaining permission from each entity, server 102 can aggregate all permissions into a single token. Thus, there can be a one-to-one, one-to-many, many-to-one, or many-to-many relationship between request 124 and DAT 150. Similarly, there can be a one-to-one, one-to-many, many-to-one, or many-to-many relationship between DAT 150 and one or more of an owner of private data. Further, access to the same data set of private data (e.g., the same set of data records) can be defined in more than one of DAT 150. In this case, each DAT 150 may be owned by an entity and may control access of the entity to the data set. Different entities can have different types of access (e.g., each DAT 150 can define a different DAAP). The private data may also be bifurcated into data sets. In turn, access to each data set can be controlled by one or more of DAT 150. As such, there can be a one-to-one, one-to-many, many-to-one, or many-to-many relationship between DAT 150 and one or more data sets of private data.

DAT 150 can be considered a digital data structure in memory 130, or other suitable non-transitory computer-readable memory (e.g., RAM, Flash, SSD, HDD, etc.) in a tokenized format. Of particular interest, DAT 150 represents a persistent permission that exists until DAT 150 is consumed, burned, or otherwise used by the owner of DAT 150, entity 104 in the example illustrated. The advantage of having DAT 150 exist as a persistent permission is because entity 104 might not wish to use the permission immediately, but may wish to wait for an extended period of time before using the token to access the private data fields. In such cases, as discussed further below, the private data values could be escrowed for future access. Aspects of DAT 150 are described in more detail with respect to FIG. 2 below; however, a few features are presented below to provide greater context for system 100.

In the example shown, DAT 150 includes several features that aid in management of one or more of DAT 150. DAT identifier 152 comprises a token identifier that can be used by the various elements of the system 100 to identify a token, preferably a specific unique token. In some embodiments, the DAT identifier 152 can include a unique identifier, a globally unique identifier (GUID), universally unique identifier (UUID), hash value, or other unique identifier. Such identifiers can be automatically generated by server 120 according to one or more rules as desired. For example, the DAT identifier could be generated from a hash (e.g., SHA256, Keccak-256, MD5, etc.) calculated from combining one or more data structures related to request 124. The resulting hash, assuming low to no chance for a collision, can then be used as DAT identifier 152 or can be a part of DAT identifier 152 in embodiments where DAT identifier 152 is a multi-valued object.

DAT 150 can also include one or more of token owner identifier 154. In the example shown, token owner identifier 154 would likely represent entity 104 or possibly requestor device 105. Token owner identifier 154 binds DAT 150 to a specific entity in order to ensure DAT 150 is only available to the entity that has secured the access rights to the private data values. When multiple token owner identifiers are used, each associated with an owner, DAT 150 can provide, to the associated owners, the same or different access rights, access to the same or different fields or private values of the private data, and/or the same or different access protocols (e.g., DAAPs). Token owner identifier 154 can be used by entity 104 to manage DAT 150 through interactions with private data exchange server 120. Management of DAT 150 by the token owner can include one or more management functions including burning the token, using the token, consuming the token, selling the token, transferring the token to a new entity, inventorying owned tokens, or other forms of interacting with DAT 150. Token owner identifier 154 could also take on different forms depending on the desired embodiments. In some embodiments, token owner identifier 154 could include an address (e.g., P2PKH address, P2SH address, Bech32 address, portion of a 256-bit hash, GUID, UUID, etc.) to an account management utility that stores cryptographic keys in support of network-based operations, which may uniquely identify a record-keeping system account associated with the token owner. Thus, the token can be "stored" in the account management utility of entity 104 and retrieved for future use. A person having skill in the relevant cryptography art will appreciate that an entity's account management utility for network-based exchanges can comprise more than one account address. Thus, entity 104 could have multiple addresses associated with the corresponding record-keeping system technology where each address could operate as token owner identifier 154.

DAT 150, in more preferred embodiments, also includes Data Access Activation Protocol (DAAP) 156. DAAP 156 provides information by which a remote device, requestor device 105 for example, is able to activate access to and/or interact with the requested private data values corresponding to fields of interest 126. To be clear, one should understand that, in more preferred embodiments, DAAP 156 provides for activating access rather than providing direct access to the private data values. Such an indirect approach to providing access has multiple advantages. First, the approach ensures the data owner, entity 102 for example, remains in control over records 114 or field-value entries 116. Second, the system 100 provides the ability to distance the token owner from the actual data so that they cannot necessarily alter the private data. Third, through such abstractions it is possible to allow the token owner to interact with private data values without actually having access to the data values, possibly via a homomorphic encryption workspace as discussed further below. Thus, one should appreciate DAAP 156 provides for highly flexible, technical control over the access of private data values without compromising their security or privacy as well as permitting the data owner to remain in control over their private data. DAAP 156 will be discussed in further detail with respect to FIG. 2.

Beyond identifiers and DAAP 156, DAT 150 can include other information as well to support management or interactions with DAT 150. Thus, DAT 150 can also include one or more supporting data constructs as represented by DAT data 158. DAT data 150 can include a broad spectrum of information. In some less preferred embodiments, it is possible that DAT data 158 could comprise private data values associated with the fields of interest 126, field-value entries 116 for example. However, encoding the private data values without sufficient privacy controls could compromise the private data. Additionally, DAT data 158 can include other types of data including access dimensions (e.g., time period of authorized access of an owner of DAT 150, number of authorized accesses of an owner of DAT 150), metadata, timestamps, version numbers, attributes of DAT 150, data describing the nature of DAT 150, time-to-live information, links to data sources (e.g., private database 110, entity 102, etc.), data owner identifiers (e.g., authorization identifier 112, etc.), video data, image data, audio data, originating request data (e.g., request identifier, request structure, fields of interest, etc.), or other types of data modalities.

It should be appreciated that DAT 150 can be generated in many different ways. In more preferred embodiments DAT 150 should be generated or instantized in a manner consistent with use of a target record-keeping system represented by record-keeping system 130. While there are many possible types of record-keeping systems, it should be further appreciated that the core DAT features described herein can be generalized across the spectrum of record-keeping system technologies. More preferred record-keeping systems 130 are considered immutable in a manner where external or third-party entities are able to validate or verify when attempts are made to alter the record-keeping system. Some existing record-keeping systems achieve this by distributing a copy of the complete record-keeping system on participating computing nodes. Record-keeping system 130 is illustrated as a non-limiting blockchain record-keeping system for discussion purposes. Record-keeping system 130 comprises a series of blocks where an existing block 155A is linked to a current block 155B, which in turn will be linked to a yet to be created new block 155C. The blocks in blockchains are typically "linked" via hash values. Thus, block 155B incorporates a hash value of block 155A into its own data structure. Then, when created, block 155C incorporates a hash value of block 155B into its own data structure. Without departing from the inventive subject matter, record-keeping system 130 can include other types of record-keeping systems beyond a mere blockchain (e.g., Ethereum, Solana, Polygon, Cardano, etc.), hashgraphs, directed acyclic graphs, blockchains (e.g., BitCoin, Dogecoin, Litecoin, etc.), or other forms of record-keeping systems. Still further, crypto operations may be used for creating exchanges (e.g., operate as private data exchange server 120, etc.), such as Binance, CoinBase, OpenSea, Rarible, SuperRare, TopShots, FLOW, or Foundation just to name a few.

DAT 150 can be integrated into record-keeping system 130 according various techniques. In some embodiments, DAT 150 could be stored directly in a block as shown in block 155B. This approach has the advantage of DAT 150 being directly accessible in the corresponding block chronicling the creation or other operations associated with DAT 150. However, in view of many existing record-keeping system technologies requiring all nodes to store a copy of the record-keeping system, storing DAT 150 in the record-keeping system could be costly or inefficient as more and more DATs are stored across all nodes, thereby growing without limit. In other more efficient embodiments, DAT 150 can be stored off record-keeping system in a different data store, which reduces the overall global storage requirements and eases the pressure of growing the record-keeping system too fast or too large. Off record-keeping system storage can be achieved by storing DAT 150 or its individual parts (e.g., DAAP 156, DAT data 158, etc.) in a database, on a web server, in a file system, on cloud storage array, on a NAS, on a SAN, or other computing device having an indexed storage schema. Still, recording generation or other operations of DAT 150 on record-keeping system 130 can include a link to where DAT 150 is stored. For example, token identifier 154 can comprise the link where the link is the token identifier or where the link is part of the token identifier data structure. Example links can include URLs, URIs, identifiers (e.g., digital object identifiers (DOIs) and other identifier types), file names, or even hash values. Example techniques for using one or more identifiers can be found in U.S. Pat. No. 11,017,897 to Soon-Shiong, filed on Jan. 3, 2014, the content of which is incorporated herein by reference. An identifier (e.g., a HOI as referenced in U.S. Pat. No. 11,017,897) of DAT 150 could include a prefix that points to the network location of the data store and the suffix can point to the specific location at the network, possibly identifying the specific block of data representing DAT 150. Additionally, one or more DAT 150 HOIs could have a prefix that alternatively points to a block in the record-keeping system and the suffix point to a specific related operation. This approach could provide a double link where the record-keeping system uses a HOI to point to the permanent location of DAT 150 and DAT 150 can have an additional HOI that points to the corresponding operation in record-keeping system 130.

In view that DAT 150 could be stored off record-keeping system, it is possible links pointing to DAT 150 could become stale in the sense the link may no longer become valid. Further, to mitigate the risk of DAT 150 becoming lost or becoming no longer available, more preferred embodiments use a permanent data store. For example, DAT 150 and links to DAT 150 can be made more permanent through the use of a distributed file system. Example distributed file systems include the Inter-Planetary File System (see URL ipfs.io), torrent-based file systems (e.g., BitTorrent, etc.), CEPH file system (see URL docs.ceph.com/en/pacific/cephfs/index.html), or other such file systems supporting more permanent records. Further, DAT 150 could also be stored on record-keeping system file systems where the record-keeping system itself supports a file system, possibly including Chia Networks (see URL www.chia.net) or Filecoin (see URL www.filecoin.io) both of which support decentralized storage. Yet further, DAT 150 could be stored in a hybrid system where blocks in a record-keeping system are stored according to a hash-based protocol. Rather than requiring all nodes to store the complete record-keeping system, each node only stores some blocks and other nodes store other blocks. For example, rather than all nodes storing a single block, say five distinct nodes would store duplicates of the single block. Thus, all nodes in aggregate would be able to provide access to the complete record-keeping system, but no single node has the complete record-keeping system, which reduces storage requirements. Example techniques that can be adapted for constructing such a distributed record-keeping system can be found in U.S. patent application publication 2019/0267119, filed on May 13, 2019, the content of which is incorporated herein by reference. More specifically, such a distributed record-keeping system provides for tracking operations as well as for storing DAT 150 or other types of tokens (e.g., NFTs, bearer tokens, tokens from a multi-token set, etc.) in a more efficient manner.

Additional record-keeping system technologies that could be used with the inventive subject matter include IOTA tangle (see URL www.iota.org), Hedera hashgraph (see URL hedera.com), Hyper Ledger Project blockchain (see URL www.hyperledger.org), IBM Watson® Blockchain services, Kaledio blockchain, Stellar blockchain, and so on. More preferred record-keeping systems include those supporting smart contracts, or more specifically NFTs, including Ethereum (see URL ethereum.org), Cardano (see URL cardano.org), Tezos (see URL tezos.com), Solana (see URL solana.com), FLOW (see URL onflow.org), Polygon, or EOS.IO (see URL eos.io) just to name a few. Each of these and others include infrastructure for supporting minting, transferring, or otherwise managing digital tokens on their corresponding record-keeping systems. Many of these record-keeping systems support test nets for creating and testing the custom smart contracts. For the purposes of the following discussion, Ethereum will be used as a non-limiting example.

Figure 2:
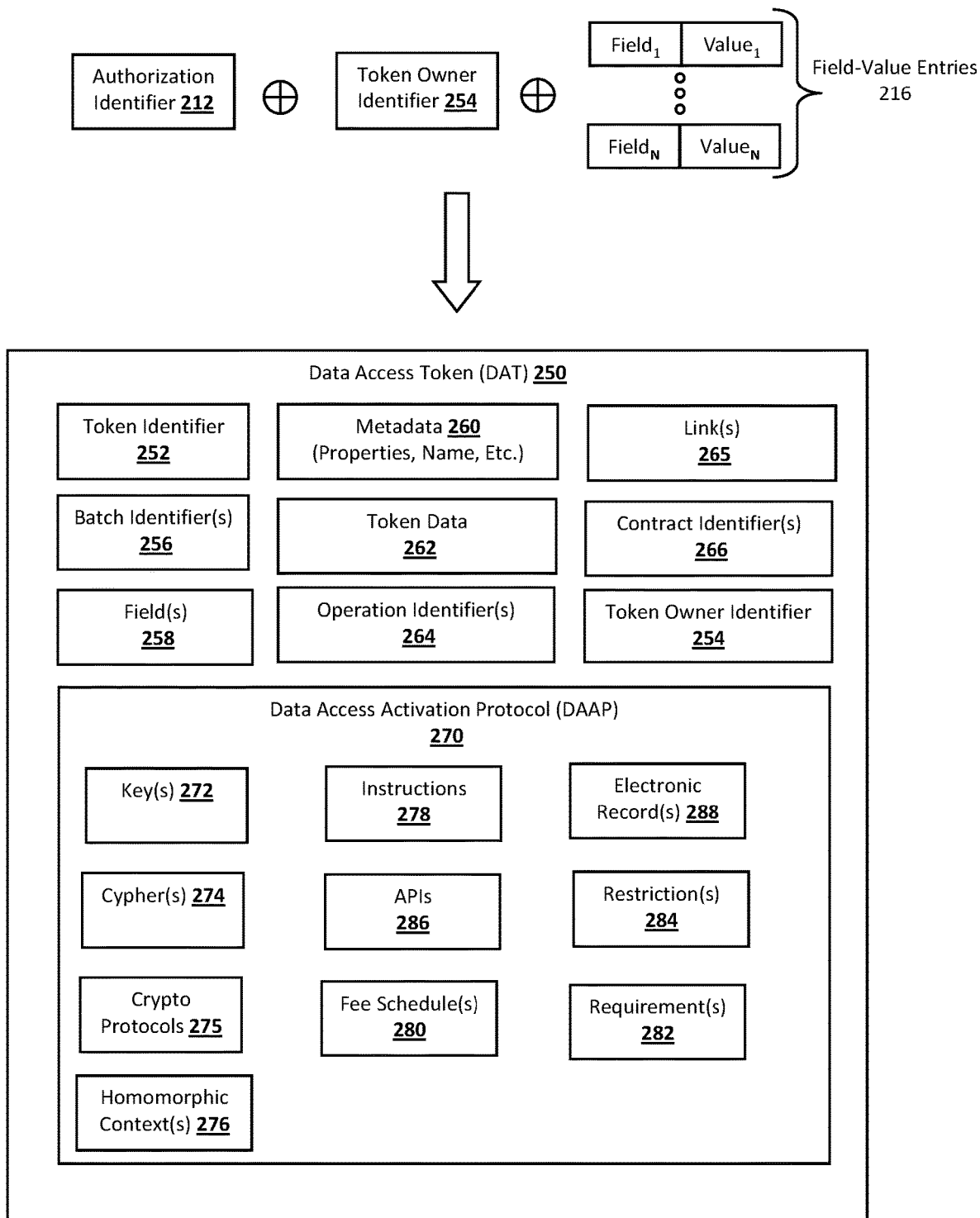
FIG. 2 presents a representation of a DAT having a digital access activation protocol (DAAP).

FIG. 2 presents a more detailed overview of a Data Access Token (DAT) 250 and includes various features of DAT 250 that provide utility for managing or otherwise using DAT 250.

As referenced above DAT 250 comprises a token that permits the owner of the token to access private data while the private data remains under control or ownership of the original data owner. A token can be considered a data structure that memorializes the rights of the token owner with respect to the private data, especially the private data values of field-value entries 216. The data structure in more preferred embodiments can be considered to be governed by a smart contract executed between the owner of the data and the new token owner. With respect to the Ethereum blockchain, smart contracts are programs (i.e., software instructions) that can be written in the smart contract language Solidity (see URL soliditylang.org). The smart contracts can execute on Ethereum virtual machine (EVM) computing nodes. Further, many existing smart contract programs, including NFT smart contracts, are available for use or modification from OpenZepplin (see URL openzeppelin.com/contracts and github.com/OpenZeppelin/openzeppelin-contracts). While a smart contract governs how DAT 250 is tracked on a record-keeping system, the features of DAT 250 govern the various roles or responsibilities with respect to providing access to the private data as represented by field-value entries 216.

In some embodiments, DAT 250 is a manifestation of interactions with a smart contract as recorded or chronicled on a record-keeping system as discussed above. Typically, interactions comprise operations that are then encoded within the record-keeping system. DAT 250, for example, can comprise an NFT that possibly meets the Ethereum NFT standard ERC-721 (see URL eips.ethereum.org/EIPS/eip-721), which defines a standardized API for tracking or transferring NFTs as recorded on the corresponding record keeping system. More specifically, when DAT 250 is or comprises an NFT, then DAT 250 represents a non-fungible right to access the corresponding private data values.

Still, DAT 250 could comprise or be a part of a multi-token set representing one or more rights. In such cases, more than one DAT 250 could be minted to provide rights to more than one entity. An acceptable standard for multi-token sets includes the Ethereum multi-token standard ERC-1155 (see URL eips.ethereum.org/EIPS/eip-1155). Multi-token sets can be advantageous when an entity comprises multiple individuals that should have access to the desired private data values. For example, an entity might wish to have a multi-token set where many individuals of the entity should have access rights. Each individual can be granted a token from the set so they can proceed with their tasks.

Yet further DAT 250 could comprise multiple sub-tokens or even part of a supra-token. Said differently, DAT 250 could be a token that itself is made of other tokens or DAT 250 could be an individual token combined with others to give rise to a new token. Each compound token and its individual component tokens could be NFTs. Ethereum Composable Non-Fungible Token Standard ERC-998 (see URL eips.ethereum.org/EIPS/eip-998), while still under development at the time of this writing, represents a possible composable token structure standard. Composable tokens may be useful in cases where aggregated data sets, say across a cohort of patients, are required. For example, a clinician running a clinical trial might require access to all individuals in the clinical trial. In such a case, the clinician might be granted an NFT providing access to the whole data set where the NFT includes multiple NFTs, one for each individual, that grant access to each individual's private data.

One familiar with Ethereum might wonder about use of a fungible token, possibly based on ERC-20 (see URL ethereum.org/en/developers/docs/standards/tokens/erc-20). ERC-20 outlines an interface through which one can create a set of tokens that are essentially indistinguishable from each other. While it is technically possible to create a version of DAT 250 that operates as a basis for fungible tokens, it is considered less preferable. One reason is an NFT or tokens having limited fungibility provides for high fidelity management of access rights. Each time a token owner obtains an NFT or uses the NFT, the corresponding operation is recorded on the record-keeping system, thereby creating an audit trail of who does what and when with the data. Fungible tokens are less trackable because it is not possible to tell the difference between one token and another. Use of fungible tokens would likely better serve data warehousing institutions which have multiple partners working together to create a record-keeping system. Thus, the fungible tokens can be awarded to partners that perform integrity checks, block storage, or other record-keeping system activities. In some scenarios, such fungible tokens may operate as a closed crypto-based system among the partner entities. Thus, the inventive subject matter is considered to include creating or managing fungible tokens as a means for supporting operations related to DAT 250 within the ecosystem.

Although DAT 250 is illustrated as a single data construct, DAT 250 is typically deployed as a token within the context of a smart contract. As such, DAT 250 may be recorded on a record-keeping system as an operation that meets the protocols, requirements, or standards of the target record-keeping system technology and the smart contract as alluded to above. For example, DAT 250 may be recorded on the Ethereum blockchain as a non-fungible token following an ERC-721 standard compliant smart contract interface. In which case, when the DAT 250 is minted (i.e., a minting operation) as an NFT, the operation of minting of the NFT is recorded on the record-keeping system rather than recording the token data itself on the record-keeping system. Further, when such NFTs are transferred to a new owner, the transfer of ownership is recorded on the record-keeping system. The purpose of recording the operation in the record-keeping system rather than storing the actual token on the record-keeping system is to reduce the overall storage burden of the record-keeping system on the various participating nodes (e.g., virtual machines, computers, containers, etc.) in the record-keeping system. Still, it is possible to store the actual token data on the record-keeping system, but such storage incurs, among other things, an additional storage burden. Typically, the token data itself would be stored off the record-keeping system, on a web server, cloud-based system, or a remote file system for example. In such cases when the NFT operation is recorded, the operation may include a link such as URI, URL, hash address, or other link that points to where the token data resides on the network.

From an implementation perspective, DAT 250 can be instantiated or otherwise created as a standalone data object. In some embodiments, DAT 250 could be built according to one or more object-oriented class definitions, possibly in binary format in memory. Still, in more preferred embodiments, DAT 250 can be serialized via a markup language so that the content of DAT 250 can be digitally stored, transmitted, processed, or otherwise managed. For example, DAT 250 can be created using XML, JSON, YMAL, or other type of markup language to encode the various features of DAT 250. Thus, DAT 250 can comprise a set of hierarchically organized sets of data for ease of reading or processing.

DAT 250 is illustrated as having many features to support management via a corresponding record-keeping system as well as to support the roles or responsibilities related to providing a right-to-access the private data. Several important features include token identifier 252, token owner identifier 254, and possibly token links 265. These specific features aid in managing DAT 250 on the corresponding record-keeping system. Still, other features may also be important and should not be simply discounted. For example, in some embodiments, DAT 250 could also include one or more of authorization identifier 212, which aids in binding the associated owner(s) or authorized manager(s) of the private data to DAT 250. One should appreciate that some of these features may change with time. For example, token owner identifier 254 could change as a token owner transfers ownership of DAT 250 to another owner. Similarly, if DAT 250 includes authorization identifier 212, authorization identifier 212 could change when an owner or authorized manager of the private data transfers ownership of the private data to another entity. Interestingly, inclusion of authorization identifier 212 in DAT 250 can be used as one of the many control mechanisms to validate DAT 250. For instance, a field of the private data can include an authorization identifier (or some other data structure can associate authorization identifier 212 with the private data). If such an authorization identifier is different from authorization identifier 212 included in DAT 250, access to the private data can be unauthorized and, thus, can be denied.

Token identifier 252 typically is a data value or object that identifies a specific DAT 250 on the target record-keeping system. In some embodiments, token identifier 252 comprises a unique identifier (e.g., GUID, UUID, URI, hash, SHA-256 hash, Keccak-256 hash, address, etc.), which may be a single value (e.g., a hash, a number, etc.) or multi-valued (e.g., JSON data set, etc.). However, it is also possible token identifier 252 could comprise other values as required or desired by the minter of the token (e.g., a name, a number, a place, etc.). For example, a data owner could mint successive tokens simply using sequential token identifiers of 1, 2, 3, 4, and so on. As a more concrete example, consider a scenario where an entity wishes to provide access to private data. Each DAT 250 they mint could be based on the entity's owner NFT smart contract. Each time a DAT 250 is minted as an NFT, the token identifier can be incremented by 1. DAT 250 would be identified by the smart contract name (e.g., the entity's name; see authorization identifier 212, etc.) and incremented token identifier. For the purposes of this discussion, the reader may assume token identifier 252 comprises a unique value so that DAT 250 may be distinguished from other tokens on the record-keeping system. Still, the reader should be aware that in some embodiments token identifier 252 could be used to represent a token set (e.g., an ERC-998 token, ERC-1155 token, etc.).

Token identifier 252 could be generated algorithmically based on the content of the private data or other data associated with DAT 250. For example, token identifier 252 could be generated via execution of an implementation of a hash algorithm (e.g., SHA256, Keccek-256, MD5, etc.) on various data associated with servicing the request for access to the private data. As illustrated, the hash could be the result of hashing the authorization identifier 212 with the token owner identifier 254 and possibly the field-value entries 216 that are responsive to the request. This approach is considered advantageous because the resulting hash unifies the private data with the operation participants. Such hashes can then be used at a future date during an audit or as a method of verifying the operation.

In a somewhat similar vein, token owner identifier 254 is a data value that specifically, preferably uniquely, identifies the current token owner of DAT 250. When DAT 250 is minted, the token owner identifier most likely corresponds to a NULL or zero values, but could also be the authorization identifier 212 of the data owner or other authorized entity. Further, authorization identifier 212 could be an identifier of the system managing the instantiation of DAT 250 (e.g., token management service, an authorized entity, a data owner, etc.). When DAT 250 is transferred to a new owner, then a corresponding operation is recorded on the record-keeping system with the updated token owner identifier 254. Thus, the record-keeping system chronicles the chain of custody of DAT 250 from one operation to another. For the Ethereum blockchain, a token owner identifier 254 would comprise an address of the token owner, which typically is the last or least significant 20 bytes of a hash (i.e., Keccak-256) of the public key of the new token owner. In many embodiments, the token identifier 252 and the token owner identifier 254 form a unique pair that represents the token, which can then be found on the corresponding record-keeping system. Similarly, in the case of DAT 250 including authorization identifier 212, when ownership of the private data is transferred, then a corresponding operation is recorded on the record-keeping system with an updated authorization identifier. Thus, the record-keeping system can also chronicle a chain of custody of the private data and the continuous use of DAT 250 to access the private data that is now owned or managed by the new entity.

In view that the DAT 250 can be considered the product of a smart contract (e.g., Ethereum Solidity contract, Solana Token Program, etc.), DAT 250 may also include information related to the corresponding smart contract. Such information is represented by contract identifier 266. Contract identifier 266 enables the system to call back into the specific smart contracts interfaces. While contract identifier 266 typically is based on an address, an Ethereum contract address for example, it is also contemplated that contract identifier 266 could also be other forms of addresses including a URL, URI, DOI, IPv4, IPv6, network addresses, internal APIs, or other types of address. An especially interesting contract identifier 266 can also comprise an HOI or portions therefor. HOIs are described in U.S. Pat. No. 11,017,897 to Soon-Shiong, filed Jan. 3, 2014, the content of which is incorporated herein by reference. Further, contract identifier 266 can include or can point to additional information regarding the corresponding contract under which DAT 250 is instantiated. For example, the prefix of a HOI could comprise the smart contract address while the suffix might point to a corresponding block or even to a corresponding API. Thus, the inventive subject matter is considered to include binding HOIs to smart contracts so that one can use HOIs to interface with a corresponding record-keeping system. Additionally, or alternatively to including contract identifier 266, DAT 250 can include some or all of the data objects of a smart contract.

Batch identifier 256 is leveraged to indicate DAT 250 is a member of a larger group of tokens. For example, a data owner may wish it make a collection of data available (e.g., one or more groups of field-value entries 216, etc.) to multiple parties of interest. In such cases, DAT 250 might be a member of a batch of tokens that include a token for each part. In such embodiments, one or more of batch identifiers 256 may be used for multi-token sets that may adhere to ERC-1155. Batch identifier 256 may be considered optional in support of larger token management. For example, batch identifier 256 could comprise the name of the type of tokens, the name of an entity making the tokens, a sequence number indicating the request being serviced, or other types of identifier. In a similar vein, batch identifier 256 may also represent a composable token according to ERC-998. Said in a different way, batch identifier 256 may include a root identifier that can be used for the set of individual tokens that compose DAT 250. Batch identifier 256 may be stored on the record-keeping system or off the record-keeping system.

Field(s) 258 represents a compilation of fields (see field-value entries 216) that are considered responsive to the original request (see request 124 of FIG. 1) submitted by the original requestor. While fields 258 may be considered optional, one should further appreciate providing fields 258 allows for future audits with regard to how the system or private data is used. Further, fields 258 do not include, or rather should not include, corresponding values as the private data values are considered to represent actual private data that should remain secured. Generally, the private data can change over time (e.g., fields and/or data added, edited, or deleted), resulting in updated data. DAT 250 can indicate whether it is usable as-is to access the updated data, whether DAT 250 needs to be updated to access the updated data, and/or whether a new DAT is needed for the access to the updated data. In an example, a field identifier and/or a data identifier can be included in DAT 250 and can be used to manage usage of DAT 250 in relation to the updated data. Fields 258 can include the field identifier and/or the data identifier. For instance, the field identifier can be generated by applying a function (e.g., a hashing function) to the underlying fields of the private data (or to the accessible fields thereof). The fields could change over time, resulting in updated fields. In this case, the field identifier included in DAT 250 would become invalid (e.g., would no longer match a hash of the updated fields). Because it is invalid, DAT 250 may no longer be usable to access the private data, unless the field identifier is properly updated in DAT 250. Similarly, the data identifier can be generated by applying a function (e.g., a hashing function) to the data values of the private data (or to a portion thereof). The data values could change over time, resulting in updated values. In this case, the data identifier included in DAT 250 would become invalid (e.g., would no longer match a hash of the updated values). Because it is invalid, DAT 250 may no longer be usable to access the private data, unless the data identifier is properly updated in DAT 250. These two examples correspond to restricting access upon a change to the private data. Permissive access upon a change is also possible. For instance, a field identifier can correspond to a particular subset of fields (e.g., core fields). Whereas other fields can change (e.g., added, edited, or removed), as long as the core fields remain the same, the field identifier would not change and DAT 250 remains usable to access the private data (including any data values under a newly added field, conditioned on permissions provided by other data elements of DAT 250). Similarly, a data identifier can correspond to a particular subset of data values (e.g., core data value). Whereas other data values can change (e.g., added, edited, or removed), as long as the core data values remain the same, the data identifier would not change and DAT 250 remains usable to access the private data (including any new or edited data values, conditioned on permissions provided by other data elements of DAT 250). As further described herein, in addition or alternative to using field and/or data identifiers to manage access to updated private data, an escrow can be used.

In some scenarios, fields 258 and possibly their corresponding values might have a life time of validity. For example, a request may be submitted to the private data exchange server for a collection of individuals having ages between 20 and 25 years and having treatment outcomes. The server can then generate DAT 250 that is responsive to the request. However, the requestor might not access the corresponding private data via DAT 250 until more than a year later, which could cause the individuals' ages to fall outside the requested range. In some embodiments, the private data exchange server could generate a new DAT 250 to service the request upon access of the original DAT 250 based on the corresponding smart contract requirements (e.g., ensure the request requirements are still values, timing constraints are still valid, etc.). In other more interesting embodiments, the private data exchange server can operate as a data escrow service or server, where the private data exchange server causes the private data values (e.g., fields-values 216), likely associated with fields 258, to be stored in preparing for use of DAT 250. The escrowed data can be stored on a private data exchange server, the private database, or other accessible data storage device, preferably in a secure fashion (e.g., encrypted, locked, etc.). This approach is considered advantageous because the token owner may not use DAT 250 immediately or may use DAT 250 over a long period of times (e.g., weeks, months, years, etc.).

Additional data beyond fields 258 is represented by token data 262, which may comprise additional data in support of DAT 250. In some embodiments, token data 262 may include original request information (e.g., query, keywords, request, keys, etc.), image data, audio data, video data, or other data modalities in support of DAT 250 or in support of management of DAT 250. For example, token data 262 might include a logo of a data provider to thereby brand where DAT 250 originates. Further, token data 262 could include data that is more functional, possibly programs, scripts, applications, operating systems, or other executable images. For example, in some embodiments, token data 262 could include one or more data viewers (e.g., browsers, dashboards, video players, histopathology viewers, x-ray viewer, etc.). This approach is advantageous because in some scenarios the use of DAT 250 might exceed the practical life time of the ability to access the corresponding values of fields 258. Thus, older data viewers might be necessary to view old data, including possible escrowed private data values as referenced above. Typically, token data 262 would reside off record-keeping system in view of the potentially high storage requirements. However, as with the other fields discussed with respect to DAT 250, it is possible token data 262 could be stored on a record-keeping system, but possibly at additional cost to the token owner. Token data 262 can also include containers (e.g., Docker, Kubernetes, etc.) or virtual machine information for the viewers. In implementations that leverage technologies such as Foundation (see URL foundation.app), token data 262 could be stored on IPFS for example, which may be accessed by one or more of links 265.

Metadata 260 comprises data that describes or otherwise characterizes DAT 250 itself. Metadata 260 can take on many different forms and include features such as time stamps, when DAT 250 is created or when the request was generated, a list of supported data modalities, token size, standards to which the token adheres, version numbers, or other information related to DAT 250.

Operation identifier(s) 264 represents an identifier associated with any operations associated with the DAT 250. Typically, such identifiers would likely be stored on the record-keeping system and may be a hash value or derived from a hash value associated with DAT 250 or a corresponding block in which the DAT 250 operation resides. For example, operation identifier(s) 264 could comprise a block identifier portion and a specific operation identifier portion within the block. Thus, operation identifier(s) 264 could be considered an HOI(s) as discussed in U.S. Pat. No. 11,017, 897 to Soon-Shiong, filed on Jan. 3, 2014, the content of which is incorporated herein by reference.

One or more of link 265 may also be associated with DAT 250. Link 265 also provides a mechanism by which DAT 250 may be coupled with external data. Typically, say for ERC-721 NFTs on the Ethereum blockchain infrastructure for example, link 265 may be stored on the record-keeping system itself along with or in the corresponding operation where the link comprises a URI (e.g., URL, HOI, DOI, etc.). Thus, the operation as recorded can point to other data, possibly token data 262 for example stored off the record-keeping system. In more preferred embodiments, link 265 is a link to a more permanent or secured network storage device where additional data (e.g., audio, video, executables, games, etc.) can be found and accessed upon authentication.

The above discussion regarding various features of DAT 250 have related mainly to the token itself and have been only tangentially related to accessing the private data to which DAT 250 is bound, which motivates the discussion regarding data access activation protocol (DAAP) 270. DAAP 270 can be considered a protocol, policy, procedure, or other types of instructions necessary to allow the token owner, or rather a device associated with the token owner, to activate access and/or interact with the actual values from fields 258 (e.g., field-value entries 216, etc.). As with other features of DAT 250, DAAP 270 may be stored off the record-keeping system or on the record-keeping system as desired, subject to costs or fees. Due to the possible complexity of DAAP 270, in some embodiments, DAAP 270 may be preferably stored off the record-keeping system, as part of a dedicated storage system (see FIG. 1), part of IPFS, a distributed file system, a local file system under control of the private data exchange server, or other network-based data store.

DAAP 270 includes sufficient information to allow the token owner via a computing device to access their requested data at a future date after instantiation of DAT 250. In some scenarios, the token owner might use DAAP 270 to access field-value entries 216 data immediately after instantiation of DAT 250. However, in other scenarios, the token owner might use DAAP 270 to access field-value entries 216 at a future date. For example, the token owner might use a significant amount of time compiling multiple data sets, possibly many cohorts across many clinical trials, before processing the collected data. In either case, DAAP 270 may be instantiated to respect the timing of the data access relative to the time of a request. More specifically, DAAP 270 can be constructed to include an activation time or an activated time period when DAAP 270 could be leveraged by the token owner. Such time-based limitations can be embedded in the smart contract (see contract identifier 266) used to instantiate DAT 250 and/or corresponding DAAP 270.

Keys 272 represent any required cryptographic keys that may be necessary to access fields-values 216 or other private data values in embodiments where the private data is secured via encryption. Such keys might not be necessary when a priori existing public or private keys of a token owner are used. However, in some embodiments, the system might require keys that are specific to DAT 250 or specific to the original request for private data values, fields-values 216 for example. In such cases, the keys might be distinct from or different than the keys directly to the token owner. Further, in some embodiments, DAAP 270 may be encrypted according to a private or public key of the token owner so that only the token owner may access keys 272 at a future date. Thus, the token owner can then use their own keys to access keys 272 and in turn use keys 272 to obtain access to the request private data values. Providing such flexibility in key management as represented by keys 272 is considered advantageous because the keys necessary to access the private data values need not be dependent on the actual token owner and permits transfers of DAT 250 to new token owners. Some of the keys 272 may be an authentication key(s) of the authorized entity and/or a data access key of the owner of DAT 250.

Cyphers 274 represent one or more cryptographic encryption or decryption algorithms that may be necessary to exchange data with the system to obtain access to the private data. Non-limiting example algorithms that may be used include AES, 3DES, RSA, Blowfish, Twofish, PGP, elliptical curve-based encryption (ECC), or other types of encryption. One should appreciate cyphers 274 may only require a name of an algorithm along with required parameters, with a possible version number, rather than an implementation of the algorithm itself. Still, it is contemplated an implementation could be stored for future use in cases where older algorithms fall out of favor or versions change over time. Thus, cyphers 274 could be packaged as a JSON data structure to outline the necessary or conditional cypher requirements.

Crypto protocols 275 comprises a list of required or optional protocols for accessing the requested private data values. Protocols 275 are typically network protocols in view that private data may be located on a remote data source (see private database 110 in FIG. 1). Such cryptographic protocols ensure communications relating to the private data values remain secure and adhere to privacy requirements. Example protocols include SSL, FTPS, TLS, HTTPS, IPSec, or other protocols. Crypto protocols 275 may operate in cooperation with keys 272 or cyphers 274. Typical end points of such protocols may include the token owner's device, the private data exchange server, the remote private database, or other devices operating within the ecosystem.

In some embodiments, DAAP 270 may also comprise one or more JSON Web Tokens (JWT: RFC 7519; see URL datatracker.ietf.org/doc/html/rfc7519), which allow a token owner to properly claim its right to access the private data values. The owner of DAT 250 may use the token to authenticate the token owner's right (e.g., claim) for access by providing the JWT to the device (e.g., private database, data owner's device, private data exchange server, etc.). While a JWT could be referenced in token data 262, in more typical embodiments, a JWT would be used in conjunction with crypto protocols 275 to unlock or gain access to the private data values. Additionally or alternatively, cryptographic functionalities described herein are an example technique for securing the private data. Other techniques are possible and can include other types of data obfuscation processes. For instance, transcoding can be used in addition or alternatively to encryption to obfuscate the private data such that it may no longer be readable or usable to an unauthorized entity. An example of transcoding includes representing text data contained in the private data by using image data (e.g., a text describing a medical condition of a patient can be transcoded into a black and white image that may not be understood by a human reader). In this illustration, DAAP 270 can include parameters and protocols of the data obfuscation.

Of particular interest, DAAP 270 preferably comprises one or more of homomorphic encryption contexts 276. Homomorphic encryption (HE) is a type of encryption where two devices are able to establish a shared encrypted working memory such that neither device can actually observe the clear text data in the memory, but are also able to operate or compute on the encrypted data while it remains encrypted. Use of homomorphic encryption (e.g., partial homomorphic encryption (PHE), somewhat homomorphic encryption (SHE), fully homomorphic encryption (FHE), etc.) is considered highly advantageous because it permits the token owner to operate on the requested data values without exposing the private clear text data values to the token owner, thereby retaining privacy. Establishing HE work sessions that may be adapted for use with the inventive subject matter is described in U.S. Pat. No. 11,050,720 to Soon-Shiong et al. titled "Homomorphic Encryption in a Data Processing Network Environment, Systems and Methods", filed on Jul. 27, 2020, the content of which is incorporated herein by reference. Further, acceptable technologies for creating HE contexts include the PALISADE open source package supporting multiple HE schemes (see URLs palisade-crypto.org and gitlab.com/palisade/palisade-release) or Google's general purpose transpiler for fully homomorphic encryption (see URL github.com/google/fully-homomorphic-encryption/blob/main/transpiler/docs/white paper.pdf).

In more preferred embodiments, HE context 276 comprises an application layer program that makes service calls into a lower layer of an HE package, possibly PALISADE referenced above, possibly hosted by private data exchange server 120 from FIG. 1. The software instructions associated with the application layer program may be defined to outline the necessary cryptographic functions, underlying HE schemes (e.g., BFV, CKKS, etc.), or supported operations (e.g., math, index, etc.) based on the desired HE schemes. HE contexts 276 can be implemented in different ways possibly including a self-contained container or a virtual machine, a binary executable package, a markup language file (e.g., JSON, XML, YAML, etc.) comprising context configuration parameters, or other types of implementations. Thus, when the token owner, via a computing device, wishes to access the values of field values 216, the owner's device reads HE contexts 276 and executes the corresponding operations on the private data without directly accessing the private data. This may also involve establishing a secure connection with the private data exchange server 120 via keys 272, cyphers 274, and/or crypto protocols 275. Interestingly, use of such cryptographic techniques (e.g., HE, cyphers, etc.) provides for authenticating or validating a token owner via zero-knowledge proofs, possibly through the use of pairing-based cryptograph, just to name one approach.

DAAP 270 may further include other features beyond cryptographic capabilities that may also contribute to or facilitate accessing private data values. For example, instructions 278 can comprise one or more software suites or application programs that could be executed by the device of the token owner to operate on the values of the requested fields. Instructions 278 could comprise compiled programs, byte code files, executable binaries or libraries, scripts, or other executable code that may be executed by the owner's device or a device under control of the token owner. Rather than the owner's device itself accessing the data fields via execution of instructions 278, the owner's device may call one or more of APIs 286 (e.g., remote procedure calls, RESTful APIs, etc.) that are exposed on private data exchange server 120 or possibly private database.

One or more of fee schedule 280 may be present in cases where a token owner may be required to provide for accessing the private data values. Fee schedules 280 can include different costs for different types of access. For example, the cost of simply viewing the data might be low, while the cost for operating on the data in conjunction with other data might be high. Alternatively, accessing the data via an HE workspace might be low, but actually viewing the data might be high. Once fees are provided by the token owner via a monetary operation (e.g., financial operation, cryptocurrency operation, etc.), the token owner can be granted permission to proceed with access. Such fees or royalties may be preferably embedded into the smart contract underlying DAT 250. Thus, one aspect of the inventive subject matter is considered to include leveraging smart contracts to impose fee requirements via DAAP 270.

In some embodiments, DAAP 270 may optionally include one or more of electronic records 288 related to the requested private data values. Thus, the token owner may access the electronic record data directly from DAT 250 once the data has been encrypted and appropriate token ownership authentication is established. Electronic records 288 may be stored off record-keeping system or on record-keeping system as discussed above. However, in view of the fact that the electronic record is private data, storing off record-keeping system is more preferred to enforce privacy by ensuring the data does not appear on a public record-keeping system. Still, having electronic records 288 within or accessible by DAAP 270 may also be advantageous to ensure the token owner is able to access the desired data at any time in the future in case the original private data is no longer accessible or otherwise available without an escrow service. Such approaches are advantageous in embodiments where a token owner wishes to interact with a substantial amount of private data, but the data must be collected over an extended period of time. Typical use cases for such approaches include longitudinal studies, collecting machine learning training data sets, long term data analysis or other such uses. For example, in some embodiments a data owner could create a machine learning system, possibly including a trained neural network. In such case, DAAP 270 could provide rights to access and use the trained neural network or other trained AI model (e.g., SVM, classifiers, trees, random forest, unsupervised classifiers, regression models, etc.).

To further support accessing the requested private data, DAAP 270 may further include restrictions 284 or requirements 282. While these are presented as members of the DAAP 270 data structure, it should be appreciated that each of these could be embodied by one or more sets of software instructions (e.g., byte code, scripts, compiled software, smart contracts, JSON file, XML file, etc.). These members of DAAP 270 aid in further refining how or the manner by which a token owner, or rather the token owner's device, is able to access the private data values.

Restrictions 284 represent one or more criterion that restrict access to the private data values, field-value entries 216 for example. Restrictions can be considered a set of limiting factors that reduce the ability of a token owner to access the data. Restrictions 284 may be defined by the data owner, the private data exchange server, or other entities in the system that are authorized to do so. Example restrictions could include time-based restrictions. For example, access could be provided only during certain time periods or after an absolute time or relative time has passed. Still further, the private data values might only be available at a certain data rate to conserve bandwidth relative to other requests, which could give rise to increased fees (see fee schedule 280) for high priority access. Restrictions could further include non-time-based restrictions. For example, restrictions could also limit permissions by which a token owner gains access or based on location (e.g., wireless triangulation, received signal strength, GPS, mobile device, geographical location, location within a building, geo-fences, etc.). Example permissions could include read-only, write, read-once, a number of times data can be read, permissions on copying accessed data, permissions on editing accessed data, permissions on distributing accessed data, permitted recipients of accessed data beyond the token owner, or other types of restrictions that limit access or throttle access. Restrictions 284 could also be coupled with fee schedule 280 by which a token owner may have to provide additional costs or fees according to the restriction set by restriction 284 as alluded to above with respect to priorities. For example, the token owner might not be charged an initial fee to access the data, but then each subsequent access could incur additional fees or even graduated fees. Beyond fees, restriction 284 might also comprise information related to the nature of access; number of accesses, one time use possibly based on a bearer token, or other counts. Restriction 284 need not be limited to access restrictions to the private data values. For example, restriction 284 can indicate limits on the ownership transfer of DAT 250. For instance, restriction 284 may not permit the ownership to change to a particular entity or, if changed, may restrict the access protocols (e.g., DAAP 270) to particular mechanisms and/or the access to the private data to particular fields thereof. In another example, restriction 284 can indicate limits on changes to DAT 250 or DAAP 270, such as restrictions about moving DAT 250 from a record-keeping system to another, burning DAT 250, editing DAAP 270, and the like.

While somewhat similar to restrictions 284, requirements 282 represent conditions or criteria that must be met before access is granted. Where restrictions 284 limit access, requirements 282 do not permit access until any or all requirements are met. Requirements 284 can include one or more criterion defined based on the nature of token owner, data owner, attributes of data, fields of data, private data values in the data, or other factor associated with DAT 250. Once DAT 250 is constructed or otherwise instantiated, the data owner may no longer control how the request private data values are accessed, but still may wish to impose one or more requirements. Example requirements could include agreeing to a license, verifying token ownership, authentication of the token owner or device, providing required fees, sending notifications to the data owner, the data owner granting any final permission, etc. As with restrictions 284, requirements 282 may also be coupled with fees schedule 280.

An interesting requirement 282 of DAAP 270 may include a requirement for when DAT 250 might be terminated. The term used for removing or otherwise disabling a token on a record-keeping system is "burned." Once a token is burned, it is no longer available and is considered permanently gone or useless. In order to gain access to the requested private data values of a previously burned token, a new similar token must be minted de novo. With respect to requirements 282, requirements can include one or more conditions under which DAT 250 is burned. The conditions can cover a broad spectrum of factors. For example, DAT 250 could be burned after a single use or after a specific number of uses. Further, DAT 250 could be burned on direction of the token owner by calling the "burn" API of the corresponding smart contract that governs DAT 250. The token could further be burned when a condition based on time is met. If the token's life time is expired (e.g., at a specific absolute time, at a relative time, etc.), then the token can be burned.

One should appreciate that burring DAT 250, at least in some embodiments of record-keeping systems, is a one-time process that cannot be undone. Once burned, DAT 250 is no longer available and is considered non-existent even though the record of the minting operation and burning operation still exists on the record-keeping system. While it may seem counterinitiative to retain token operations on the record-keeping system for a burned token, it should be appreciated such techniques provide for auditing or accounting for interactions with private data values at a future date. Further, the act of burning the DAT 250 includes deleting or otherwise removing it or its supporting data (e.g., DAAP 270, etc.) from its storage place, possibly removing it from IPFS for example. Burning DAT 250 may also incur costs associated with the corresponding record-keeping system technology. For example, if DAT 250 exists on a record-keeping system of Ethereum, burning DAT 250 might require "gas" (i.e., a payment of Ethereum to motivate processing the operation). Burning DAT 250 may include creating a burn operation that sets the token address (e.g., token identifier 252, etc.) to a verifiably un-transactable address, a NULL or zero address for example. The gas payment in more preferred embodiments may be provided by the token owner and may be accounted for in payments to the data owner when DAT 250 is minted. In some embodiments, DAAP 270 or its features could be encrypted where DAAP 270 or its parts are stored in a more permanent way with a one-time key which is discarded. This ensures DAAP 270 can no longer be accessed because the key is no longer available. The one-time key and encryption can be based on cryptographic algorithms that are difficult to break, perhaps using a 4096-bit, or larger key, for example.

Although DAT 250 is represented as a token and DAAP 270 is a part of the DAT 250, one should appreciate that DAT 250 may comprise a collection of sub-tokens. For example, DAAP 270 could be instantiated as an individual token, which then composes DAT 250. This approach allows for construction of individual pieces of DAT 250 before combining into an aggregated whole for the token owner. For example, the token owner could request access to hundreds, if not thousands of records from one or more private databases. The private data exchange server can service the request by compiling individual or a collection of DAAP 270 for each request. Each of DAAP 270 may then be minted as a token. The collection of newly minted DAAP 270 tokens may then be aggregated to form DAT 250 as a single token. This enables simplified management of collections of private data value access rather than requiring each individual data request to have a separate token. In some embodiments leveraging the Ethereum ledger, DAT 250 may comprise one or more sub-tokens according to the Ethereum composable token standard ERC-998. In an example, DAT 250 can include one or more of a DAAP identifier of a DAAP rather than the DAAP(s) itself (themselves). A DAAP identifier can uniquely identify a DAAP and, optionally, provide a link thereto. Conversely, DAAP 270 can include one or more of a token identifier 252.

DAT 250 is preferably robust with respect to transfers from one token owner to another token owner. Thus, the various features of DAAP 270 must also be robust against transfers. For example, if DAAP 270 is encrypted according to one or more keys of the current token owner, the system may decrypt DAAP 270 and then re-encrypt DAAP 270 using the new token owner's keys. Such an approach is advantageous because it ensures the corresponding private data remains private when a token is transferred. Still, the private data exchange server or other corresponding agent may keep track of the actual data corresponding to DAAP 270. To further protect DAAP 270, the decryption and encryption process may be executed within a protected memory of a server (e.g., the private data exchange server, etc.) to ensure the private data values or other token values remain secured even when in clear text form. Example protected memory includes those that adhere to FIPS 140 (e.g., FIPS 140-2, FIPS 140-3, etc.), which has multiple levels of compliance to ensure a memory is inaccessible to unauthorized entities. Similarly, DAT 250 can be made robust with respect to transfers of the private data from one data owner to another data owner. For example, the DAT 250 can include one or more of authorization identifiers 212. As explained herein above, authorization identifier 212 can be used in one of the many mechanisms to validate whether DAT 250 is usable to access the private data, where this usage can become invalid upon a transfer of the private data and upon not updating authorization identifier 212 to indicate the new data owner.

One aspect of DAT 250 that should be appreciated is DAT 250 can be considered a permanent, individually manageable object. Such permanence is of high technical value because it addresses how data or data access protocols may age. As time passes, some data formats may no longer be supported or protocols may become obsolete. Thus, DAT 250 not only provides access to desired private data under a controlled method, but also ensures the data as it existed at a point in time will remain accessible as time passes via one or more escrow services.

One should appreciate that DAAP 270 may be implemented according to different techniques. In some embodiments, DAAP 270 could comprise binary executable or compiled data that adheres to a specific encoding format (e.g., BERs, bytecodes, etc.). In other embodiments DAAP 270 might be implemented as serialized data, possibly in a markup language (e.g., JSON, XML, YAML, etc.). Still further DAAP 270 could also be implemented as a container (e.g., Docker, Kubernetes, etc.) or as a virtual machine, which can be executed on the token owner's devices, private data exchange server, a cloud system, or other suitable device.

Figure 3:
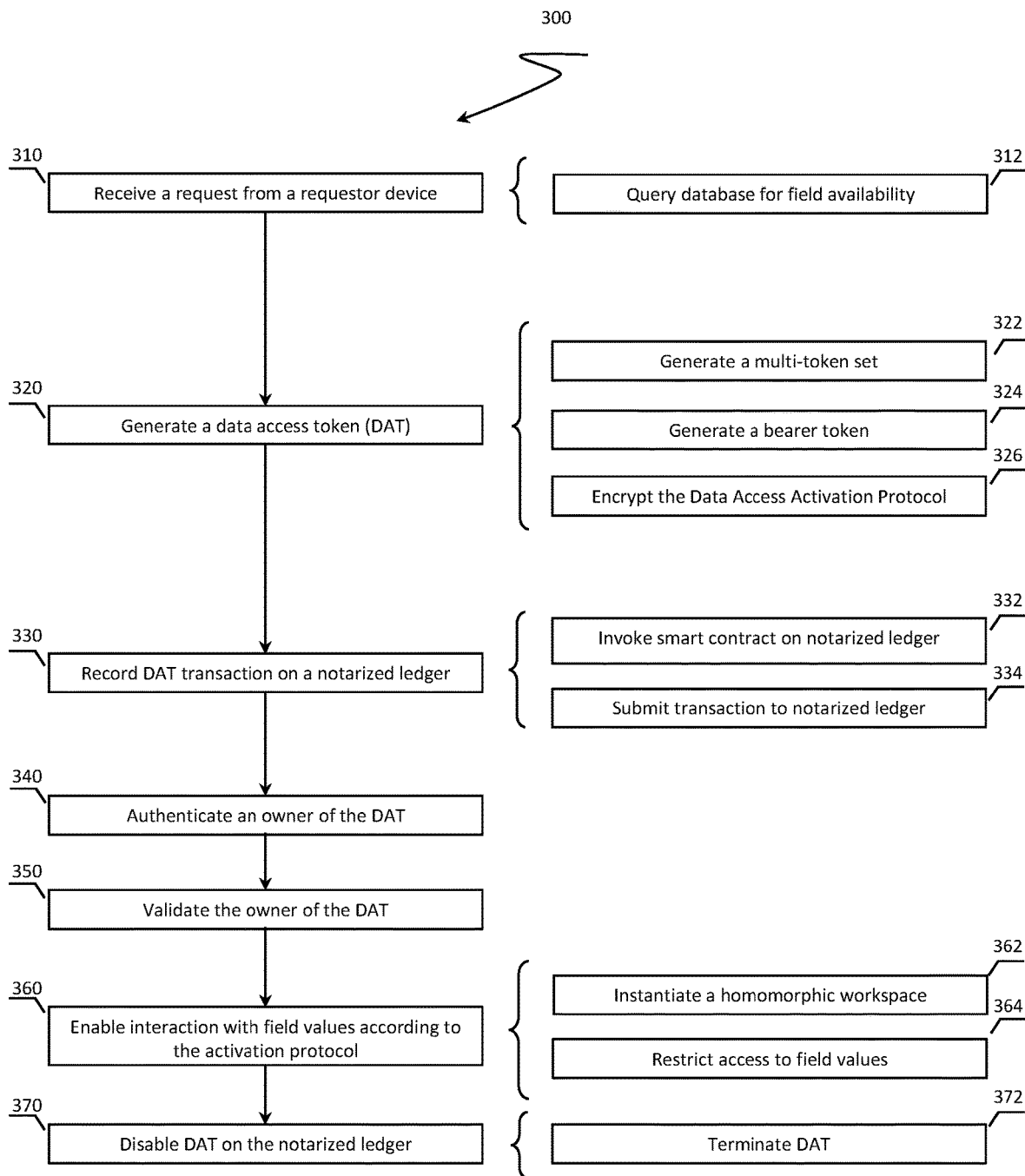
FIG. 3 presents a method of accessing private digital data using a DAT and a DAAP.

FIG. 3 provides additional details regarding management of private data via tokens, especially non-fungible tokens (NFTs). Method 300 represents a method of managing access to private data via data access tokens (DATs). One should appreciate method 300 is considered a computer-based or computer-implemented method where one or more computing devices, forming a system (e.g., system 100 of FIG. 1), execute software instructions stored in one or more non-transitory computer-readable memories to perform the operations depicted in method 300. For example, one or more private data exchange servers (e.g., server 102 of FIG. 1) may perform one or more of the steps of method 300 individually or collectively.

Beginning at step 310, a device (e.g., a private data exchange server, etc.) receives, over a network, a request from a requestor device. The request embodies a request for private data records having data fields and corresponding private data values, which may be owned or otherwise controlled by one or more other data owners. Further, the private data records are considered private information that should not be shared unless the data owner permits or authorizes access. The request typically includes one or more identifiers that indicate which fields are of interest to the request. The request may be encapsulated as part of a network-based communication protocol that allows the requestor device to communicate with the device over a network. The protocol may leverage one or more protocols, possibly based on HTTP, HTTPS, web services, RESTful APIs, queries, custom APIs, or other forms of network communication. For example, a private data exchange system could host one or more RESTful APIs through which the requestor device may submit request. Such requests can be packaged in a serialized format (e.g., JSON, XML, YAML, etc.) while adhering to a defined private data namespace.

One should appreciate that the request for fields of interest could be quite complex to address the needs of the requestor (e.g., the token owner of the DAT, current DAT owner, etc.). Thus, the request could comprise a number of features that outline the data needs of the request. In some scenarios, the request could simply comprise a request for information from a specific person, for a specific person, and/or for a specific type of information. In such a simple case, the response to the request could comprise an acknowledgement (i.e., an ACK) indicating an appropriate DAT providing access to the single-valued response might be created. However, in more complex scenarios, the requestor might wish to access a large amount of data across many private data records. In such cases, the data exchange server may respond with an ACK that includes a message indicating what can be achieved along with a format to which the data could conform (e.g., a serialized data format, namespace, etc.). Further, the resulting DAT would provide access to a compiled set of data rather than a single value. Such scenarios are advantageous when generating machine learning training data sets, for example, or trained AI models, especially when the data has to be de-identified as discussed further below.

While in some embodiments, the requestor device may know a priori which data fields are available for access, in other embodiments the available fields may not be a priori known by the requestor or the requesting device. In such cases, method 300 may include step 312 which includes querying a database for which fields are available for access. The requestor device could submit the query directly to the private database, which may provide a result set comprising which fields are available. Further, the requestor device may transmit an initial request to the private data exchange server, which can operate as proxy. The server may know which fields are available or may query a private database for available fields and then forward the information on to the requestor device. One should appreciate that providing field information does not necessarily compromise the private nature of the private data because the values thereof are not revealed or the field information can be de-identified. Still, in other embodiments, the requestor device might request specific fields and in response the proxy server may only respond with just a "yes" or "no" to indicate the specific request may be serviced. If not, the requestor device might have to generate a new request to probe further for a result set of available fields. Thus, it should be appreciated there is a spectrum of possible embodiments by which a requester device can discover which fields having private data values may be available to access.

At step 320 the method can continue by one or more processors creating a data access token (DAT) that services the request. As discussed previously, the DAT is a digital data construct stored in one or more computer memories representing a right or permission to access the private data values. While it is possible for the DAT to include the values of the requested fields of interest, in more preferred embodiments the DAT provides information back to the requestor device on how or under what conditions the private data values of the fields may be accessed. To be clear, the DAT does not necessarily include the private data values. Rather, the DAT represents a data construct recorded on a record-keeping system as an operation and that represents a right to access.

The DAT can be generated numerous ways. From the perspective of a smart contract, say on the Ethereum blockchain network, the DAT can be embodied as one or more data structures that meet a smart contract according ERC-721 and written in Solidity, which outlines the requirements for a non-fungible token (NFT). Thus, the DAT can comprise an NFT. Example data for preparation of calling a minting function for the DAT could include an address of the data owner and a token ID. While this example references using the Ethereum blockchain, one should appreciate that DAT came generated or packaged for other record-keeping systems without loss of generality. For example, the DAT can be constructed on a record-keeping system for a Solana-based smart contract program that can be written in C, C++, Rust, Python, or other languages. Further, in some embodiments, the DAT is packaged with the data values responsive to the original request and can be stored on a file system, IPFS or Chia network for example. At this point in method 300, the DAT is prepared or is being prepared, but is not yet minted.

While some embodiments focus on generating a single NFT that permits access to the private data, there can be embodiments where an NFT comprises a multi-token set. As suggested by step 322, such embodiments may include generating a multi-token set that comprises a DAT. A multi-token set of DATs can be generated as one or more data structures according to a smart contract that adheres to ERC-1155, or possibly ERC-998 for Ethereum. Such embodiments are considered advantageous for several reasons including when multiple requestors request the same data or data sets. Each requestor may be granted a single token from the set. Additionally, a set of tokens could be compiled where there is a single token corresponding to a single data set where there are multiple data sets in the collections. Thus, the multi-token set comprises two or more individual DATs that grant access to the private data corresponding to each individual DAT.

Still further, the DAT could be generated by generating a bearer token as suggested by step 324. A bearer token represents a data construct that provides data access to the bearer, the token owner for example, but the bearer could be anyone who has the bearer token. One example of a bearer token is described in OAuth 2.0 Bearer Token Usage in RFC 6750 (see URL datatracker.ietf.org/doc/html/rfc6750). Thus, the DAT can comprise one or more bearer tokens that provide access to the private data values based on the permission granted from the data owner. For example, the data access activation protocol (DAAP) of the DAT may include a bearer token for one or more of the requested records or requested values (e.g., one token for each patient's data, etc.). The bearer token may be stored off record-keeping system, or on the record-keeping system, or could be encrypted before delivery to a token owner using the token owner's private or public keys.

When the DAT is generated, it preferably comprises one or more of DAAPs as described previously with respect to FIG. 2. When the corresponding DAAPs are generated, the DAAPs or their constituent parts can be encrypted as suggested by step 326. The DAAP may be encrypted based on the one or more of the keys owned the data owner or, more preferably the new token owner so that only the new token owner is able to decrypt the DAAP and thereby gain access to the requested private data values. One or more software implementations of cryptographic algorithms are acceptable (e.g., AES, DES, 3DES, ECC, etc.). Such an approach is considered advantageous because once the DAAP is encrypted with a private key (e.g., the private key of a token owner, etc.), it can only be accessed by the key owner, which means that private data values can only be accessed by the key owner. Thus, privacy is enforced.

Step 330 comprises recording the DAT on a record-keeping system. Recording DAT on a record-keeping system can take on different forms depending on which type of record-keeping system is used. In some scenarios, recording the DAT might include invoking a smart contract via its interface (e.g., APIs, RPC, etc.), where the smart contract is bound to the record-keeping system, Ethereum for example, as indicated by step 332. In other cases, the operation might simply be submitted to the record-keeping system as indicated by step 334. For example, when a crypto-based operation is used to acquire the DAT, this operation may be submitted to the corresponding record-keeping system (e.g., BitCoin blockchain, Dogecoin blockchain, Solana, Hashgraph, etc.). Still further, in embodiments that leverage data storage as part of their record-keeping system (e.g., Chia Network, Foundation, etc.), the DAT may be stored as actual data on a decentralized storage system (e.g., IPFS, Chia, etc.).

One feature regarding use of a record-keeping system that should be understood is record-keeping systems may only store operations. Thus, to record a DAT on such record-keeping systems, only the operation (e.g., minting, transferring, transaction, burning, etc.) relating to the DAT is recorded rather than requiring the actual DAT data structure to be stored. As discussed previously, this feature is used to reduce the overall size of the record-keeping system which is stored on each participating node, while DAT data is stored off the record-keeping system.

As discussed previously, especially with respect to NFTs, recording the DAT includes constructing an operation associated with the DAT on the record-keeping system. When a particular record-keeping system is used (e.g., Ethereum, Solana, Polygon, etc.), the recording of the DAT on the record-keeping system can comprise minting the DAT as an NFT by invoking one or more interfaces (e.g., APIs, RPCs, RESTful APIs, etc.) of the corresponding smart contract as suggested by step 332. For example, an DAT NFT could be minted by calling a function similar to:

```
function mint (address to, uint256 DATtokenId) internal
    {require(to!=address (0));
    _addTokenTo (to, DATtokenId);
    emit Transfer (address (0), to, DATtokenId); }
```

Examples of functions for interacting with blockchains and tokens can be found at openzepplin.com, a resource for building smart contracts in Solidity for example, the Ethereum smart contract computer language. In this specific mint ( ) function, the to address represents the address to whom the token will be assigned ownership. DATtokenId represents the identifier of the DAT (see token identifier 252 in FIG. 2). First, the function checks to ensure the to address is not a NULL or zero address. Next, the DAT with DATtokenId is added to the account management utility of the entity having the to address, which can cause the owner's account management utility storing cryptographic keys in support of network-based operations to be updated. Finally, the DAT is recorded on the record-keeping system by calling the ERC-721 Transfer( ) interface, which records the transfer from a NULL address (i.e., a newly minted token is not yet assigned ownership) to the target account management utility having the to address. Naturally, such a minting function can be more complex as required, but in the case of the inventive subject matter, the to address may be the data owner's address in the case where the DAT is minted by the owner or may be the address of the new token owner (e.g., the requesting entity) when the DAT is minted for the new token owner. Thus, the DAT could be recorded to the record-keeping system by minting DAT as an NFT in the name of the data owner, or in the name of the requestor or other entity as required by a desired specific embodiment. The above example is presented with respect to an NFT that adheres to ERC-721. However, it should be appreciated that other types of standard tokens may also be minted including those adhering to ERC-998, ERC-1155, or others including those yet to be defined. Still further, DATs in the form of NFTs can be generated on other record-keeping systems as well as support smart contracts including Solana, Polygon, Cosmos, Avalanche, or others.

Additional features that could be incorporated in the mint ( ) function include encrypting portions or all of DAT or DAAP; escrowing private data values; constructing or instantizing containers, virtual machines, or other applications to support viewing or accessing the private data values; managing metadata for the DAT or DAAP; verifying links to off-record-keeping system content; creating operations in support of required fees or according to fee schedules; establishing a priori homomorphic encryption work spaces in prep for use by the token owner; or other actions as discussed above with respect to FIGS. 1 and 2.

At this point, the DAT exists on the record-keeping system and the private data values could be accessed by the token owner. The operations associated with creating the DAT, and possibly the DAT itself, have been recorded on a record-keeping system, but may not have been used. Before use, although not necessarily required, the system may authenticate an owner of the DAT as indicated by step 340 in preparation for use of the DAT to access the private data values. It may be necessary for the governing device or system (e.g., the private data exchange server, the requestor device, etc.) to obtain the DAT from the record-keeping system or a storage location so that the governing device or system has sufficient information from the DAT itself to authenticate the owner (e.g., authentication protocols, keys, passwords, etc.). Authenticating the token owner may have varying degrees of complexity. In more simple cases, the token owner may be authenticated via a username-password pair to enable the token owner to log into the private data exchange server, which in turn has access to the DAT and its corresponding DAAPs via the record-keeping system. In other cases, more sophisticated techniques may rely on single-sign-on (SSO), JSON Web Tokens (JWTs; RFC 7519 as discussed above), digital signatures, digital certificates, or other single factor authentication techniques. Yet further, the token owner may be authenticated using a multi-factor system, which may require two or more factors to be established before the owner is authenticated. Such an approach may be more advantageous when privacy is of greater concern for private data values.

In some scenarios, the system or device executing step 340 may not have sufficient a priori information relating to the token owner to support authenticating the token owner. In such cases, as suggested at step 350, the system may need to validate the owner of the DAT. In such cases, step 350 may include using a token identifier to obtain information relating to the corresponding DAT from the record-keeping system. For example, the private data exchange server may use a DAT NFT identifier to search the record-keeping system for the DAT. The DAT itself may carry information relating to the token owner (e.g., token owner identifier 254 in FIG. 2, DAAP 270 information, etc.). The exchange server may then use the token owner identifier, and/or other factors to validate the token owner. While the authenticating step 340 and validating step 350 are illustrated as two separate steps, one should appreciate they can be combined as a single step or reversed as desired by an implementation. For example, authenticating the token owner may be sufficient to allow the token owner to access the private data values via the corresponding DAAP. However, in other implementations it may be necessary to continually validate the token owner during use of the DAT, possibly via a JWT claim asserting identification, to ensure the private data values remain secure. Thus, both steps could be combined as a single step, could remain separate, could be reversed, or altered to fit the requirements for a specific use case. Example techniques that more intimately bind a token owner or a token creator via biometrics to the DAT are described in U.S. Pat. No. 11,210,393 to Witchey et al., filed Jun. 28, 2021, the content of which is incorporated herein by reference.

Once the system has determined the token owner does indeed have rights to the DAT, devices associated with the token owner, as suggested by step 360, may be enabled to interact with at least the private data values of field-values entries according to the DAAP of the DAT. Recall that the DAAP (the data access activation protocol) comprises necessary or sufficient instructions for one or more of the token owner's devices that enable the devices to gain access to the private data values from the requested private records. Of particular interest, in view that private data values are considered private and should remain secure, in more preferred embodiments, the private data values are not shared with a token owner's device or stored in the memory of the token owner's device without initially ensuring proper protection for the data, which leads to the next point.

According to the DAAP, proper protection for the data may be established in one or more ways. In some embodiments, the memory where data interactions are to take place may be protected by ensuring the memory is a priori protected from unauthorized access. For example, the memory may be secured by ensuring the memory complies with one or more of FIPS 140-2 (or FIPS 140-3 when available; see URL csrc.nist.gov/publications/detail/fips/140/2/final) levels. Thus, one aspect of the inventive subject matter includes constructing a DAAP that comprises a requirement that the target memory meets or is certified to comply with a FIPS 140 security level. Further, such secured memories can be established within an escrow service for longer term use. One should appreciate that the various levels of FIPS may require software-based management via a cryptographic module as in Level 1 (e.g., encryption, memory access, etc.), while other levels may require specific hardware implementations through physical security mechanisms as in Level 4 (e.g., tamper resistant, tamper proof, etc.).

Still further, the private data values may be protected through more basic techniques by ensuring the transfer or storage of the private data values in an encrypted format based on private and/or public cryptographic keys. More specifically, the data may be encrypted so that only the token owner is able to decrypt the private data values using their own private keys. However, care should be taken so the token owner is restricted from manipulation of the private data values (e.g., copy, transfer, etc.) outside the scope of their permissions or rights. Thus, through proper encryption, the data may be transferred securely to the token owner's devices or may be securely stored in the memory of the device, possibly in a secured memory (e.g., FIPS, VM, container, etc.), while managing interactions with the private data values (e.g., private database memory, private data exchange server, token owner's device, etc.). In some scenarios, establishing secured memory in the token owner's device can include creating a container or virtual machine that possibly remains under control of an externally trusted device (e.g., the private data exchange server, authorized entity device, data owner device, etc.). This approach ensures trusted third parties are able to monitor or otherwise remain in control of the private data.

Of particular note, as indicated by step 362, the private data values may be protected by instantiating a homomorphic encryption workspace through which the token owner's device may interact or otherwise operate on the private data values. A homomorphic workspace comprises a cryptographic context (see homographic context 276 in FIG. 2) through which data may be stored in a device memory in an encrypted manner. However, of particular note, devices may operate on the data in the encrypted space without actually having access to the data or without being able to read the clear text data. Thus, the private data values remain secure even when an authorized third party (e.g., the token owner, etc.) is able to operate on the data. To be clear, the authorized third party, under such a scheme, does not have access to the private data values, but would only have access to a result generated from interacting with the private data values. Therefore, the inventive subject matter is explicitly considered to include management of a DAT as an NFT having a DAAP that comprises homomorphic encryption workspace instructions. Still further, establishing an escrow service for managing NFT-based DATs having a homomorphic encryption context is considered quite advantageous. Example techniques that may be adapted for establishing homomorphic workspaces are described in co-owned U.S. Pat. No. 11,050,720 to Soon-Shiong et al., filed on Jul. 27, 2020, the content of which is incorporated herein by reference. Further, homomorphic workspaces may be instantiated by leveraging one or more homomorphic encryption software libraries such as the PALISADE open source library (see URL palisade-crypto.org and gitlab.com/palisade/palisade-release) or Google's transpiler (see URL github.com/google/fully-homomorphic-encryption).

Homomorphic workspaces may be instantiated in any practical device memory as long as the various stakeholder devices are able to access the workspace. Thus, the workspace may be established in the memory of the computer device operating as the private database, as the private data exchange server (which is the more preferred device), data owner's device, the token owner's device, or other device that may be trusted. One of the advantages of using a homomorphic workspace includes protecting the privacy of the token owner. While the workspace does indeed protect the private data values from the token owner, the workspace also protects the token owner's interactions from becoming visible to other third parties. Therefore, creating the workspace in a non-transitory computer-readable memory of the private data exchange server is the more preferred route as it would be a memory distinct from the data owner's device and the token owner's device. Still further, this approach creates market value because the homomorphic encryption services, especially escrow services, offered by the private data exchange server may be monetized according to one or more fee schedules.

Yet another interesting aspect of leveraging the homomorphic workspaces, in conjunction with a DAT or DAAP, is the feature that such workspaces may be established or otherwise instantiated before the token owner accesses or uses the DAT. For example, upon the generation of the DAT (see discussion related to step 320 above) and the corresponding DAAP, the private data exchange server may instantiate a homomorphic workspace using a homomorphic workspace context, token owner ID, token owner keys, or other token owner information. The DAAP can indicate when, where, type, and number of homomorphic workspaces that need to be instantiated. While the workspace might not be immediately accessed, the workspace can be constructed so that it persists in time or is persistent until the token owner decides to proceed to use the DAT. The workspace may be instantiated in memory; however, once instantized, the workspace may be escrowed or stored on more permanent storage media (e.g., hard drive, SSD, flash, etc.) until it is needed. When needed, the stored workspace may then be re-instantiated in a memory so that the token owner may proceed with access. For example, the workspace could be packaged as a virtual machine, a Kubernetes™ container, a Docker™ container, or other type of package. Thus, the server may launch the workspace along with its encrypted private data values or required APIs to support the token owner's interactions with the private data values associated with the requested fields of interest.

Interactions with the private data values can take on a broad spectrum of operations on or with the private data values depending on the needs, requirements, or desires of the token owner. Each type of permitted interaction can also include a required fee. Interactions may range from compiling or aggregating data from the private data values to performing complex operations (e.g., data reduction, generating machine learning training data sets, deriving or calculating new values from the private data values, etc.). The extent of the permitted operations may be governed by the available APIs, instructions, restrictions, requirements, or other features of the DAAP (see FIG. 2, DAAP 270). Of particular interest, the system may restrict access to the private data values as indicated by step 364. Restrictions may restrict the token owner to specific APIs, possibly unlocking high level APIs in exchange for a fee. Still further, the restriction may be placed on the values corresponding to specific fields or to the whole requested data set. For example, the token owner may be restricted to a certain number of accesses, to a certain time or time period when access may be granted, to a life time of the DAT, or other such restrictions. Such restrictions could be enforced via a JWT as discussed previously. Such restrictions would typically be enforced by the DAAP. However, in some embodiments, the restrictions may be enforced by the corresponding smart contract that governs interactions with the DAT. Such an approach is useful because each interaction could then be recorded on the corresponding record-keeping system, which gives rise to the ability to audit how or when the private data values are used.

After any required conditions have been met, method 300 may optionally include disabling the DAT on the record-keeping system as suggested by step 370. While in some scenarios the DAT may be a permanent right granted to the token owner, in other implementations the DAT could be disabled to further protect the private data records. For example, as alluded to previously, the DAT might have a life time over which it remains valid. After the life time has expired, the DAT may be disabled as governed by the corresponding smart contract. This can be achieved by calling the appropriate smart contract API (e.g., burn (unit256 DATtokenId) for an ERC-721 compliant DAT NFT, etc.) for the DAT.

Burning such a token may include simply sending the token via a Transfer( ) API to an address that is not accessible or does not have an accessible private key; a NULL or zero address for example, which renders the DAT unusable. Other example conditions that may trigger disabling a DAT can include a one-time use of the DAT, exceeding a number of uses, intentional action to disable the DAT by the token owner or data owner, failure to receive a payment or upon receipt of a payment, court order to disable the DAT, or other circumstances.

In more severe implementations, the DAT may be completely terminated as indicated by step 372. While termination of the DAT certainly encompasses disabling the DAT, it can have further consequences. Recall that a DAT can comprise additional data beyond merely recordation of an operation including various supporting data structures, not the least of which is the DAAP. In view that the DAAP provides the requirements, conditions, instructions or other features necessary to access the private data values, destruction of the DAAP may also be required to ensure the DAT is sufficiently terminated. Therefore, in some embodiments, terminating the DAT can include deleting or otherwise eliminating the DAAP from computer memories storing its data. For example, in embodiments where the DAAP is stored on a storage device external to the record-keeping system, the DAAP can be simply deleted, or possibly overwritten to ensure no data remains on previously allocated storage blocks on a device. In other embodiments, it may be sufficient to encrypt DAAP with a one-time key, which is then destroyed to prevent access future access. Some approaches of retaining DAAP in some form may be advantageous in embodiments where the data may be retained, possibly for regulatory reasons (e.g., Sarbanes-Oxley, etc.), depending on the nature of the private data.

Embodiments may include many additional features beyond the instantiation, use, or disabling DATs. More complete embodiments comprise additional infrastructure to manage DATs individually or collectively. For example, the private data exchange system, or other suitably enabled computing device (e.g., browser computer, token owner's computer, local DAT management server, etc.), can include an account management utility that stores cryptographic keys in support of network-based operations for each token owner. Such an account management utility tracks operations on one or more record-keeping systems related to the token owner. In the case of the inventive subject matter, the token owner's account management utility application can track or otherwise monitor which DATs are assigned to the token owner by the DATs token identifier and token owner's address. More specifically, when a DAT is generated (e.g., minted, instantiated, etc.), the DAT may be transferred to an address of the token owner. In turn, the account management utility can then display the DAT as owned by the token owner based on the address. Further, the account management utility can also provide management of the DAT's DAAP by providing access to a DAAP data via a link (e.g., URI, URL, address, DOI, HOI, etc.), possibly stored off the record-keeping system. One should appreciate that a token owner may have more than one address managed by the token owner's account management utility. One should further appreciate the account management utility tracks the record-keeping system operations associated with the DAT. Thus, ownership is established by the last operation on the record-keeping system referencing the DAT token identifier. Depending on which record-keeping system is used, the account management utility could comprise a customized account dedicated to the corresponding record-keeping system or could comprise a general-purpose account. There are many account management utilities that are commercially available. One example that could be suitably adapted for use with the inventive subject matter include one provided by MetaMask™ (see URL metamask.io).

As alluded to above, the token owner can also transfer the DAT to another owner assuming the DAT is indeed transferrable according to the underlying smart contract. In some cases, the owner of the private data might require the DAT to be non-transferrable for exclusivity purposes when the DAT is generated, which may be enforced by the corresponding smart contract API. Thus, if the token owner attempts to call a Transfer( ) API, an error or exception message can be emitted. The smart contract, in some embodiments, could burn the DAT if a transfer is attempted to further enforce the exclusive nature of the DAT. However, in other embodiments, the DAT may be transferrable. In this case, the token owner can transfer the DAT to a new token owner by calling the Transfer( ) API from the current owner's address to the new token owner's address. There is a subtle point here. In view that a DAT is assigned to an owner by an owner address and that an owner can have more than one address, it is possible for a token owner to transfer ownership to their self. This is advantageous because it allows a token owner to aggregate DATs in groups for easier management, where each group has a group owner address that is associated with the token owner. For example, multiple DATs could be aggregated together for use in creating a machine learning training data set, machine learning analysis, or generating trained AI models, where an owner address is assigned to the machine learning group or to a machine learning project, for example. In addition to or alternatively, the DATs could be grouped for data reduction, or any other form of analysis, regression, or predictions. As discussed above, the token owner's account management utility provides for managing such groups by their addresses. Thus, a token owner's address can be mapped to a project, a department, a machine learning task, or other aggregated work tasks.

In addition to managing an inventory of DATs, or other related operations, an account management utility that stores cryptographic keys in support of network-based operations can also provide additional DAT management functions. The account management utility can also be configured to monitor activity or interactions associated with one or more DATs. On the surface it may seem a token owner might not necessarily need a monitoring feature because they are typically the sole owner of the DAT. However, the token owner might be a large entity (e.g., healthcare company, insurance company, research company, NGO, etc.) having multiple individuals authorized to work with the entity's DATs. In this case, each individual can be assigned a permission level allowing them to access the monitoring feature of the account management utility according to the permission level. For example, an individual might only be able to see if a DAT has been used or not used, while higher permission levels might allow the individual to exercise the rights associated with the DAT. One should note that a permission level interface is not present in known crypto-based asset management accounts and is considered part of the inventive subject matter. Thus, an account management utility can scan the attributes (see metadata 260 or token data 262 of FIG. 2) of the DAT for permission levels. Further, the account management utility itself, or individual sub-accounts, can have an access permission so that individuals may only access features of the account management utility, or sub-accounts, they are permitted to access. As can be appreciated from this discussion, account management utilities can take on more features than merely presenting an inventory of cryptocurrency or NFTs.

Somewhat in the same vein as monitoring, the DAT account management utility can also be instrumented with software instructions to log events related to the DATs in wallet. As operations are executed on or related to the DATs, the operations can be recorded on the record-keeping system as well as in the account management utility along with time stamps. Still further, the account management utility can also generate one or more reports about the DATs in the account management utility. A report may be generated by submitting a query to the account management utility having DAT attributes of interest; see metadata 260 in FIG. 2, for example. In response, the account management utility reports on the result set of DATs having attributes satisfying the criteria of the attributes which may be generated. Such reports may be generated in real-time based on the underlying smart contract calling an account management utility listener or sending notifications to an account management utility application. Yet another feature of the account management utility can include generating alerts. The account management utility can comprise one or more listeners that observe the state of DATs in the account management utility or DAT operations on the target record-keeping system. While real-time alerts can leverage similar infrastructure as real-time reports, an alert is considered an important notification that must be dealt with according to a level of urgency. When alert conditions or criteria are met, the account management utility can generate an alert or other notification and send the alert to one or more target individuals who have access to the account management utility or its sub-accounts. Alerts can also be instrumented in the corresponding smart contracts, possibly in the Transfer( ) function. Such alerting capability does not necessarily have to be deployed within the account management utility itself, but could also be a feature of the private data exchange server, which then provides such management services back to the wallet via one or more interfaces (e.g., APIs, push messages, RPCs, RESTful APIs, smart contract interfaces, etc.).

Interestingly, management of DATs or even the DAAPs is not limited to what is or is not on the corresponding record-keeping systems. In some embodiments, the DAT's corresponding smart contracts can also have access to external off-record-keeping system data. External data sources, typically called "oracles" can provide data feeds representing real-world information (e.g., news sources, stock exchanges, clinical trial information, gaming data, social media, etc.). Typically, accessing such oracles can be performed by a node executing a smart contract. Thus, another aspect of the inventive subject matter includes constructing, minting, or otherwise instantiating DATs or DAAPs based on real-world, non-record-keeping system data, possibly via a record-keeping system's oracle. Record-keeping systems supporting NFTs, including Solana, Ethereum, Polygon, and others, provide access to oracles to support their corresponding smart contract infrastructure. In embodiments supporting oracles, the token owner's account management utility or sub-accounts can be instrumented to provide a dashboard or other types of reporting on oracle data that might be related to one or more DATs.

In further view that one or more account management utilities or sub-accounts may service multiple individuals at an entity (e.g., company, corporation, group, consortium, laboratory, team, game guild, etc.), an account management utility can include additional security features beyond permission levels. Recall that one of the more interesting features of using DATs is to ensure privacy of individuals represented by the corresponding private data. While a DAT does not necessarily contain the private data, it may carry information regarding the nature of the data itself by merely existing and having metadata (e.g., namespace, attributes, properties, etc.). Thus, as an added layer of security, the account management utility can secure the DAT information via encryption or other cryptographic techniques so that only authorized individuals can access the DAT data. Similar to permission-levels, the account management utility can have security levels (e.g., confidential, secret, top secret, compartmentalized, etc.). Such features are considered advantages in many applications, possibly including military applications.

Yet another interesting feature of an account management utility includes a recovery feature. Typical crypto-asset accounts are not robust against loss when managed solely by an individual. If an account is lost or can no longer be accessed, the recorded assets are lost to the token owner because the owner no longer has access to their account addresses. However, in the present inventive subject matter, when an account management utility is lost, the account management utility information can be recovered through interaction with the private data exchange server. The private data exchange server may track authorized entities (e.g., data owner, token owner, etc.). If the authorized entity is able to authenticate and/or validate itself to the exchange server, the server can scan the record-keeping system to rebuild an account management utility for the token owner. Such an approach is predicated on the server recording the appropriate token owner addresses or other account management utility information. In more simplistic embodiments, the private data exchange server can keep a backup of the token owner's account management utility information.

Interestingly the account management utility can also incorporate a dashboard or browser feature, which can provide a real-time status of all DATs, related oracle information, or other assets, within the account management utility. However, such a dashboard could be implemented separately from the account management utility in less preferred embodiments. In especially preferred embodiments, the dashboard can comprise a data collection module that populates the dashboard as appropriate (e.g., periodically, upon a triggering event, real-time, etc.), possibly from one or more oracles. More specifically, a data collection module can comprise an SNMP agent, or other monitoring agent, possibly deployed within the private data exchange server, that monitors the record-keeping system or DATs associated with the token owner (e.g., owned DATs, registered DATs, etc.). As the SNMP agents observe or receive changes to the objects under observations, the SNMP updates corresponding management information bases (MIBs) representing the observed activities or behaviors. With respect to the inventive subject matter, DATs or NFTs in general can be mapped to SNMP OIDs or MIBs as desired. As the MIBs are updated, the dashboard displays the results. Of particular interest, such a dashboard feature can be implemented based on OpenNMS (see URL www.opennms.com), which provides dashboard services for network management. However, the DAT behaviors can be mapped to reporting features of OpenNMS or new reporting features can be constructed in OpenNMS. Additional techniques for mapping behaviors can be found in U.S. Pat. No. 10,594,549 to Soon-Shiong et al. titled, file Mar. 14, 2019, the content of which is incorporated herein by reference. Thus, the inventive subject matter is considered to comprise mapping DAT behaviors, NFT operations, record-keeping system operation or behavior, escrow services, homomorphic encryption contexts or workspace services, or other behaviors to MIBs. Such observation approaches are considered very advantageous because they provide for creating DAT dashboards, especially via OpenNMS. For example, a token owner could have a MIB representing a number of owned DATs, number of valid DATs, DATs in use, fees, and so on. Such MIBs can be updated by the private data exchange service or even the underlying smart contract. Further, there is no requirement for a one-to-one mapping between an NFT and a MIB. Rather, it is possible to map features of an NFT or aggregated NFTs in a many-to-one mapping to a MIB. Thus, a smart contract, an account management utility, a private data exchange server, or other device can comprise a call into an SNMP agent to update MIBs as desired or as required.

There are multiple additional considerations that relate to the inventive subject matter that should also be appreciated. First, in existing record-keeping system technologies, including systems from Ethereum, Chia networks, Solana, Polygon etc., minting DATs as NFTs or otherwise executing smart contract operations incur operation costs. For example, Ethereum charges "gas," which is a fee provided in Ether tokens to motivate processing of the corresponding operation by Ethereum nodes running the Ethereum virtual machines. The more gas that is provided, the higher the priority for processing the operation and the faster the operation is processed. The gas price can vary quite a bit over the course of a day. Thus, the providing entity (e.g., data owner, token owner, etc.) must account for providing such fees. While such fees may be prohibitive for minting a single DAT, such fees may naturally filter interested parties down to those whom truly need or truly want access to the private data. The gas prices should not be confused with a fee provided to the data owner or owning entity. The fees provided to the data owner would be a separate operation. Therefore, the private data exchange server can manage fee operations for gas or for-fee services among the various entities and their corresponding wallets, especially with respect to minting DAT NFTs. Thus, the DAT can be created as a for-fee token. More specifically, the private data exchange server can be configured to charge a fee per unit time (e.g., 1%, 5%, 10%, scaled fee schedule for the amount of data in escrow, hosting fee, etc.) of the operation costs in exchange for the services rendered. The fees further support the private data exchange server operating as an escrow service to store the private data, DAAP, or other data until the DAT is used. At the time of this writing, Solana and Polygon have more attractive fee structures supporting minting or managing NFTs, but have less infrastructural support for oracles.

A reader familiar with known blockchains and existing distributed record-keeping system technologies will recognize operations may be typically recorded on a blockchain or on distributed record-keeping systems once a node successfully performs a cryptographic puzzle, often referred to as proof-of-work (PoW). Many PoW protocols require significant computing power to process 1000s or more hash calculations per second (e.g., SHA256, Scrypt, etc.), which consumes a significant amount of energy. PoW protocols are generally viewed as ecologically unsound due to the vast consumption of such energy, which is basically converted directly to heat. With respect to the inventive subject matter, more preferred protocols for recording operations on a record-keeping system are more ecologically sound. For example, less computationally intensive consensus algorithms include proof-of-stake, proof-of-storage, node voting, proof-of-elapsed time, directed acyclic graphs, or hashgraph just to name a few. Still further, in embodiments using a custom record-keeping system, a consensus algorithm could be as minimal as an authoritative node committing an operation to the record-keeping system which all other nodes adopt, or a small number of nodes agreeing on an operation. The advantage of such a centralized or semi-centralized approach is the system can process many more operations per second than traditional proof-of-work systems, and is limited only by processor processing speed rather than by generating difficult consensus algorithmic results. Even if the record-keeping system is centralized or semi-centralized, it can remain public if desired so that external parties can observe the record-keeping system to ensure it remain immutable or is not tampered with.

The DATs and related functionalities described in the present disclosures can have multiple use cases. Herein below are only a few illustrative use cases. The embodiments of the present disclosure are not limited to such uses.

One example use case is in the context of healthcare. With the growth of the medical record management technologies, there has been a growing need to protect medical records from unauthorized access to protect patient privacy. In many countries there are strict laws that regulate management of private health information (PHI). For example, in the United States, the Health Insurance Portability and Accountability Act (HIPAA) includes regulations that govern disclosure and use of PHI in healthcare treatment, payment and operations by covered entities. While such regulations do indeed provide for protecting patients, or other healthcare consumers, they do not address core problems encountered by patients.

One technical problem often encountered by patients is they have no access to their own health data because their health data is spread among myriad data servers under control of disparate entities, which are often not permitted to share data amongst each other. Thus, patients typically lack computer-based systems by which they can access their own data let alone know what data even exists. Still further and more importantly, patients lack authoritative computer-based control over their digital PHI, especially with respect to entities storing the patient's data.

DATs of the present disclosure can be used under control of patients, thereby enabling the patients to permit or authorize third parties to access the patient's PHI in a secure manner while also ensuring patient privacy.

In the healthcare context, records (e.g., 114 described in FIG. 1 and electronic records 288 described in FIG. 2) can comprise patient data records, electronic medical records (EMRs), electronic health records (EHRs), clinical trial data, hospital data, insurance data, payor information, CPT codes, ICD codes, prescription data, histopathology data, outcome data, biometrics, genomic data, real-time telemetry, patient waveform data (e.g., ECG, EKG, ICP, ART, CVP, EtCO2, respiration, etc.), or other types of health or medical data. It is also contemplated that the records could comprise more complex data such as trained AI models (e.g., neural networks, SVMs, etc.) that could be accessed by interested parties. It should be appreciated that the records could be associated with a single individual (e.g., a specific patient), with a group of individuals (e.g., a cohort of patients, a hospital ward, insurance groups, etc.), or other groupings. Thus, a single one of the records could be a simple name field with a specific name value of a single patient, or could be a complex hierarchy of data composing an entire cohort of hundreds, thousands, or more of patients in an experimental study or clinical trial. In such complex cases, a single field might have a value comprising hundreds, thousands, or more sub-fields and corresponding private data values.

In the healthcare context, an authorized entity (e.g., entity 102 of FIG. 1) can be the owner of one or more of a patient data record or a user that is authorized by the owner or by law to access the patient data record. In some cases, the authorized entity could include a patient where the records comprise the healthcare or medical information for the specific patient. In other cases, the authorized entity could be an organization or group of people, possibly a hospital, doctor's office, insurance company, or other types of a group. In which case, the records could include data associated with many individuals including patients, doctors, account holders, providers, holders of power of attorney, or other types of individuals.

A token owner (e.g., entity 104 of FIG. 1) can be an entity having access rights, as specified in a DAT, to access or interact with one or more of a patient data record, where the access rights are permitted by the authorized entity. For instance, the token owner is a doctor who wishes to access a patient's medical data (i.e., records 114). However, the token owner could be an insurance company, an employer, police, military, hospital, a clinician, a research, an analyst, a gaming repository, or any other entity that may require access to one or more patient data records.

As referenced above, the inventive subject matter is presented in the context of healthcare. However, the inventive subject matter can also apply to other sectors beyond healthcare, including those sectors where retaining control over private data is also important. Additional example areas that would benefit from the use of tokens to manage private data include those involving military applications, financial applications, gaming or eSports applications, business or corporation applications, network security, or other areas where data should remain securely controlled.

In another example use case, corporations could leverage the use of DATs as a technique to record rights or responsibilities of individual works. Each responsibility of an individual along with corresponding authorities can be recorded as a DAT. When the individual leaves the company, the DAT may be transferred to another individual so that the new individual has ownership of the responsibility. Further, a corporation could use disclosed techniques around DATs as an infrastructure to record obligations of the corporation due to license agreements, contracts, or other forms of agreements. The reciprocal is also true where the DATs record the rights or obligations of licensees. Such DATs can then be used to record interactions associated with the corresponding right or obligation (e.g., provide a license fee, provide a royalty, meet a milestone, etc.). In such cases, it is also possible the corporation could create its own oracles to provide data to smart contracts governing the DATs.

Yet another example includes military use cases. Much of military data is required to be secured or have specific clearance requirements before individuals are able to interact with the data. In such cases a DAT can operate as a bearer token that couples to the token owner's clearance so that, when the token owner accesses corresponding private (i.e., secret) data values, the interaction is protected and possibly recorded on a corresponding record-keeping system. In such cases, the record-keeping system would likely be best deployed on trusted internal computers that are private to the military rather than public computers. Further, homomorphic encryption provides an avenue by which a token owner might be able to interact with data having a clearance higher that the token owner's clearance. The token owner may leverage the DAAP within their DAT to create a homomorphic workspace in which the higher-level clearance data can be stored. The token owner can then interact with the data without actually seeing the data itself. Such an approach is advantageous where decisions are predicated on secret data, but the data itself cannot be disclosed.

Yet another use case includes gaming use cases. For example, there are large gaming markets associated with massive online role playing games or battle royal games, where player data or user data remains private. However, player on-line personas may be public. In such cases, the disclosed techniques may be used to permit game companies or other entities (e.g., advertisers, marketeers, other players, etc.) to access player data without determining who the players actually are, while the player may monetize access to their private data. Further, players can retain their on-line personas or even sell their characters' equipment or assets via NFTs in the same marketplace as used to provide privacy protection. Another example could include using the techniques to obtain private play data for use in generating gaming AIs. Private play data from multiple players can be aggregated via use of DATs and DAAPs to create machine learning training data sets, which can then be used to create game AIs or even for eSport events. Further, eSport franchises could use the disclosed techniques to monetize archives of their gaming data.

Yet another use case includes network security. For example, a computing network can include multiple servers operated by a service provider (e.g., content servers that support content streaming of a content provider to client devices). Network security credentials can be defined by an entity, such as digital certificates issued by a certificate authority. Such credentials may be managed in relation to the computer network over time, where the management includes any or a combination of distributing the network security credential to the servers and/or client devices, changing a network security credential of a server and/or of a client, or rotating the network's security credentials. One or more DATs and related DAAP(s) can be generated to manage the access to the network security credentials over time in support of the management of the network security credentials. The DAT(s) can indicate what network security credentials of the entity can be accessed and restrictions on their use (including time-based restrictions). The DAAP(s) can define protocols for accessing the possible network security credentials over time and/or for distributing, changing, or rotating such credentials.

Figure 4:
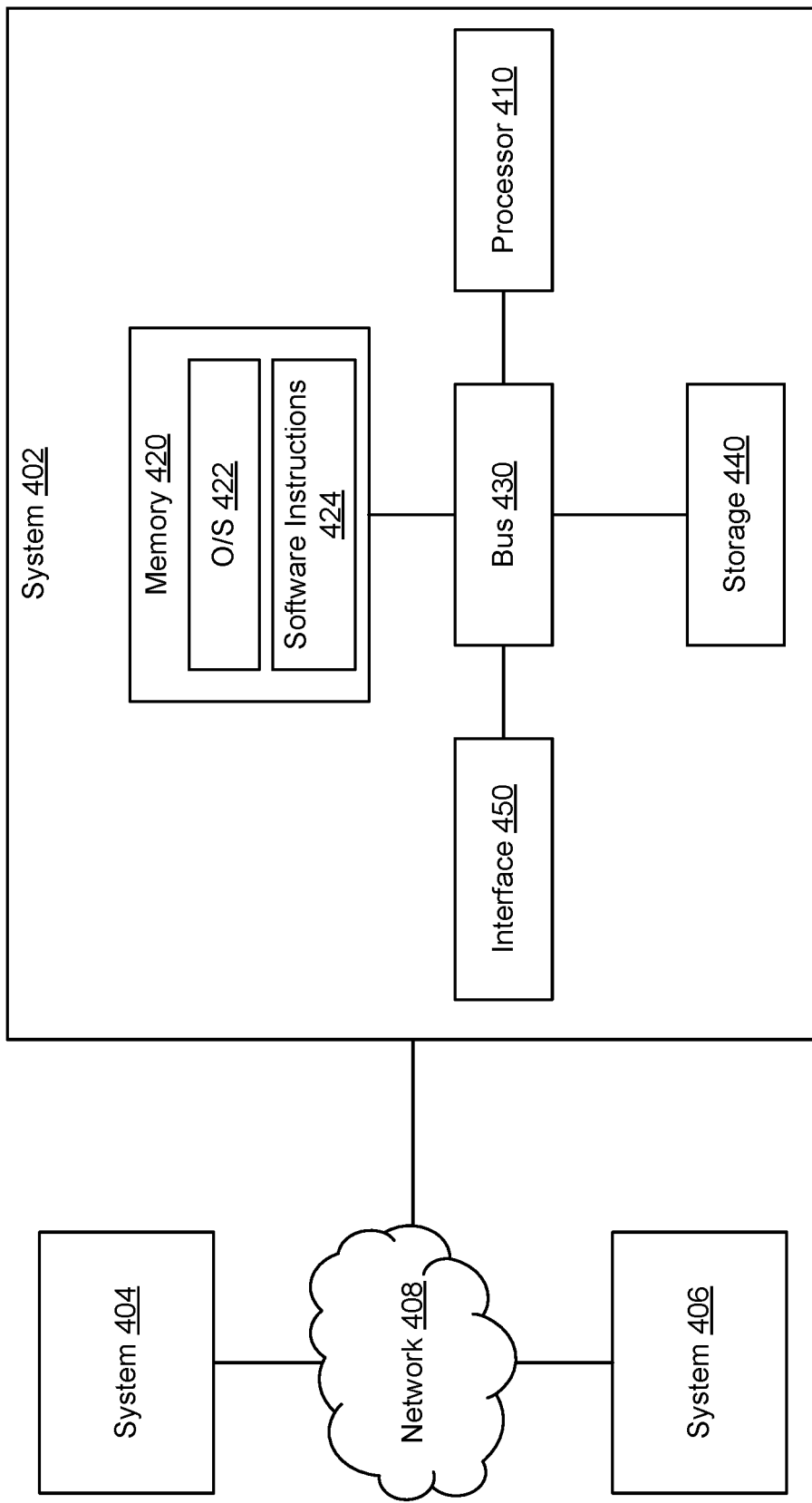
FIG. 4 is a block diagram of a distributed computer system usable to implement embodiments of the present disclosure

FIG. 4 is a block diagram of a distributed computer system 400 usable to implement embodiments of the present disclosure. Various aspects and functions described herein may be implemented as hardware, software executing on hardware, or a combination of hardware and software executing on one or more computer systems. Aspects in accord with the present disclosure may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions.

The distributed computer system 400 of FIG. 4 includes three computer systems 402, 404 and 406 (although a different number of computer systems is possible). The computer systems 402, 404, 406 can be operated by different entities (e.g., entity 102, entity 104, and an operator of server 120) and/or can be computing nodes of a blockchain network. As shown, the computer systems 402, 404 and 406 are interconnected by, and may exchange data through, a communication network 408. The network 408, an example of the network 115 of FIG. 1, may include any communication network through which computer systems may exchange data. To exchange data via the network 408, the computer systems 402, 404, and 406 and the network 408 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA IIOP, RMI, DCOM and Web Services. The communication network may further employ one or more mobile access technologies including 2nd (2G), 3rd (3G), 4th (4G), 5th (5G) generation radio access for cellular systems, WLAN, Wireless Router (WR) mesh, and other communication technologies. Access technologies such as 2G, 3G, 4G and LTE and future access networks may enable wide area coverage for mobile devices.

Computer systems 402, 404 and 406 may include clients and servers (e.g., device 103, requestor device 105, server 120, a computing node that provides record-keeping system functionalities, a computing node that hosts a database). In various embodiments, to ensure data transfer is secure, the computer systems 402, 404 and 406 may transmit data via the network 408 using a variety of security measures including TSL, SSL or VPN, among other security techniques.

Various aspects and functions may be implemented as specialized hardware or software executing in one or more computer systems including the computer system 402 shown in FIG. 4. As depicted, the computer system 402 includes a processor 410, a memory 420, a bus 430, an interface 450 and a storage system 440. The processor 410, which may include one or more microprocessors or other types of controllers, can perform a series of instructions that manipulate data. As shown, the processor 410 is connected to other system placements, including a memory 420, by the bus 430.

The memory 420 may be used for storing programs and data during operation of the computer system 402. Thus, the memory 420 may be a relatively high performance, volatile, random access memory such as a dynamic random access memory (DRAM) or static memory (SRAM). However, the memory 420 may include any device for storing data, such as a disk drive or other non-volatile storage device, such as flash memory or phase-change memory (PCM). Various embodiments in accord with the present disclosure can organize the memory 420 into particularized and, in some cases, unique structures to perform the aspects and functions disclosed herein. The memory 402 may store program code of an operating system 422 and software instructions 424 that may correspond to software instructions 132 of FIG. 1.

Components of the computer system 402 may be coupled by an interconnection element such as the bus 430. The bus 430 may include one or more physical busses (for example, busses between components that are integrated within a same machine), and may include any communication coupling between system placements including specialized or standard computing bus technologies such as IDE, SCSI, PCI and InfiniBand. Thus, the bus 430 enables communications (for example, data and instructions) to be exchanged between system components of the computer system 402.

Computer system 402 also includes one or more interfaces 450 such as input devices, output devices and combination input/output devices. The interface devices 450 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 450 allow the computer system 402 to exchange information and communicate with external entities, such as users and other systems.

Storage S system 440 may include a computer-readable and computer-writeable nonvolatile storage medium in which instructions are stored that define a program to be executed by the processor. The storage system 440 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 410 or some other controller may cause data to be read from the nonvolatile recording medium into another memory, such as the memory 420, that allows for faster access to the information by the processor 410 than does the storage medium included in the storage system 440. The memory may be located in the storage system 440 or in the memory 420. The processor 410 may manipulate the data within the memory 420, and then copy the data to the medium associated with the storage system 440 after processing is completed. A variety of components may manage data movement between the medium and the memory 420, and the disclosure is not limited thereto.

Further, embodiments of the present disclosure are not limited to a particular memory system or storage system. Although the computer system 402 is shown by way of example as one type of computer system upon which various aspects and functions in accord with the present disclosure may be practiced, aspects of the disclosure are not limited to being implemented on the computer system. Various aspects and functions in accord with the present disclosure may be practiced on one or more computers having different architectures or components than that shown in FIG. 4. For instance, the computer system 402 may include specially programmed, special-purpose hardware, such as for example, an application-specific integrated circuit (ASIC) tailored to perform a particular operation disclosed herein. Another embodiment may perform the same function using several general-purpose computing devices running the operating system 422.

The operating system 422 may manage at least a portion of the hardware placements included in computer system 402. A processor or controller, such as processor 410, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

In various embodiments, processor 410 and operating system 422 together define a computing platform for which application programs in high-level programming languages may be written. These component applications may be executable, intermediate (for example, C #or JAVA byte-code) or interpreted code which communicate over a communication network (for example, the Internet) using a communication protocol (for example, TCP/IP). Similarly, functions in accord with aspects of the present disclosure may be implemented using an object-oriented programming language, such as JAVA, C++, or C #(C-Sharp), among others. Other object-oriented programming languages may also be used. Alternatively, procedural, scripting, or logical programming languages may be used.

Additionally, various functions in accord with aspects of the present disclosure may be implemented in a non-programmed environment (for example, documents created in HTML, XML or other format that, when viewed in a window of a browser program, render aspects of a graphical-user interface or perform other functions). Further, various embodiments of the present disclosure may be implemented as programmed or non-programmed placements, or any combination thereof.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A computer-based data exchange system comprising:
at least one computer-readable, non-transitory memory storing software instructions;
at least one private database storing private data records associated with an authorized computing device having an authorization identifier, wherein the private data records comprise field-value entries; and
at least one processor coupled with the at least one computer-readable, non-transitory memory and that executes the software instructions and thereby performs operations of:
  receiving, over a network, a request from a requestor device for at least some of the private data records, the request including a requested field of interest from at least one field from the at least some of the private data records;
  generating, in the at least one computer-readable, non-transitory memory, a data access token responsive to the request and based on the authorization identifier, the data access token comprising at least:
    a data access token identifier,
    a token owner identifier representing a computing device associated with ownership of the data access token, and
    a data access activation protocol that includes:
      data access restriction criteria,
      a homomorphic context, and
      protocol instructions executable by the computing device to initiate access to at least one value corresponding to the requested field of interest, the at least one value being accessible from the at least some of the private data records rather than the data access token;
  recording the data access token on a record-keeping system;
  authenticating the computing device and validating the computing device by at least using the data access token identifier to look up the data access token and determining the token owner identifier from the data access token;
  enabling, upon authentication and validation of the computing device and by at least using a homomorphic workspace that is external to the computing device and that is set according to the homomorphic context of the data access activation protocol and to execution of the protocol instructions by the computing device, the computing device to access the at least one value of the at least one field of interest from the at least one private database;
  receiving a request to change ownership of the data access token to a second computing device;
  recording an update to the data access token on the record-keeping system, the update indicating the second computing device as having ownership of the data access token and recorded without providing access to the private data records to the second computing device;
  receiving, from the second computing device, an access request that includes the at least one field of interest; and
  enabling, upon authentication and validation of the second computing device and according to another execution of the data access activation protocol, the second computing device to access the at least one value of the at least one field of interest from the at least one private database.

2. The system of claim 1, wherein the authorized computing device includes at least one of the following: a data owner, a government, a corporation, an authentication server, and a device.

3. The system of claim 1, wherein the authorization identifier comprises at least one of the following: a name, a universally unique identifier (UUID), a globally unique identifier (GUID), a hash, and a token.

4. The system of claim 1, wherein the token owner identifier comprises at least one of the following: a name, a universally unique identifier (UUID), a globally unique identifier (GUID), a hash, an address associated with the record-keeping system, and a token.

5. The system of claim 1, wherein the data access token further comprises an authentication key of the authorized computing device and a data access key of the computing device.

6. The system of claim 5, wherein the authentication key and the data access key comprise private keys.

7. The system of claim 1, wherein the data access token manages and permits access to the private data records.

8. The system of claim 1, wherein the data access token is a member of a multi-token set.

9. The system of claim 1, wherein the data access token comprises a bearer token or a non-fungible token.

10. The system of claim 1, wherein the data access token comprises a non-transferable token.

11. The system of claim 1, wherein the data access activation protocol provides exclusive access to the at least some of the private data records for the computing device.

12. The system of claim 1, wherein the homomorphic context configures the computing device to interact with the at least one value of the at least one field of interest via the homomorphic workspace.

13. The system of claim 12, wherein the homomorphic workspace is external to the at least one computer-readable, non-transitory memory and the at least one private database.

14. The system of claim 1, wherein the data access activation protocol comprises serialized instructions targeting execution on at least the computing device.

15. The system of claim 1, wherein the data access activation protocol is stored in an encrypted format.

16. The system of claim 1, wherein the data access activation protocol comprises a smart contract.

17. The system of claim 1, wherein the data access activation protocol comprises data access restriction criteria restricting data access of the computing device to the at least some of the private data records.

18. The system of claim 17, wherein at least one criterion of the data access restriction criteria is based on an access counter.

19. The system of claim 17, wherein at least one criterion of the data access restriction criteria is based on time.

20. The system of claim 17, wherein at least one criterion of the data access restriction criteria is based on a location of the computing device.

21. The system of claim 17, wherein at least one criterion of the data access restriction criteria comprises at least one token termination criterion.

22. The system of claim 21, wherein the operations further include disabling the data access activation protocol.

23. The system of claim 1, wherein the data access activation protocol comprises a data access application program interface (API).

24. A computer-implemented method comprising:
receiving, over a network, a request from a requestor device for at least some of private data records stored on at least one private database, the request including a requested field of interest from at least one field from the at least some of the private data records;
generating a data access token responsive to the request and based on an authorization identifier of an authorized computing device associated with the at least some of the private data records, the data access token comprising at least:
a data access token identifier,
a token owner identifier representing a computing device associated with ownership of the data access token, and
a data access activation protocol that includes:
data access restriction criteria,
a homomorphic context, and
protocol instructions executable by the computing device to initiate access to at least one value corresponding to the requested field of interest, the at least one value being accessible from the at least some of the private data records;
recording the data access token on a record-keeping system;
authenticating the computing device and validating the computing device by at least using the data access token identifier to look up the data access token and determining the token owner identifier from the data access token;
enabling, upon authentication and validation of the computing device and by at least using a homomorphic workspace that is external to the computing device and that is set according to the homomorphic context of the data access activation protocol and to execution of the protocol instructions by the computing device, the computing device to access the at least one value of the at least one field of interest from the at least one private database;
receiving a request to change ownership of the data access token to a second computing device;
recording an update to the data access token on the record-keeping system, the update indicating the second computing device as having ownership of the data access token and recorded without providing access to the private data records to the second computing device;
receiving, from the second computing device, an access request that includes the at least one field of interest; and
enabling, upon authentication and validation of the second computing device and according to another execution of the data access activation protocol, the second computing device to access the at least one value of the at least one field of interest from the at least one private database.

25. The computer-implemented method of claim 24 further comprising:
storing, based on the data access token being generated, the at least one value in a data storage device, wherein the computing device is enabled to interact with the at least one value stored in the data storage device.

26. At least one computer-readable, non-transitory memory storing software instructions that, upon execution by at least one processor of a system, cause the system to perform operations comprising:
receiving, over a network, a request from a requestor device for at least some of private data records stored on at least one private database, the request including a requested field of interest from at least one field from the at least some of the private data records;

generating a data access token responsive to the request and based on an authorization identifier of an authorized computing device associated with the at least some of the private data records, the data access token comprising at least:
  a data access token identifier,
  a token owner identifier representing a computing device associated with ownership of the data access token, and
  a data access activation protocol that includes:
  data access restriction criteria,
  a homomorphic context, and
  protocol instructions executable by the computing device to initiate access to at least one value corresponding to the requested field of interest, the at least one value being accessible from the at least some of the private data records rather than the data access token;

recording the data access token on a record-keeping system;

authenticating the computing device and validating the computing device by at least using the data access token identifier to look up the data access token and determining the token owner identifier from the data access token;

enabling, upon authentication and validation of the computing device and by at least using a homomorphic workspace that is external to the computing device and that is set according to the homomorphic context of the data access activation protocol and to execution of the protocol instructions by the computing device, the computing device to access the at least one value of the at least one field of interest from the at least one private database;

receiving a request to change ownership of the data access token to a second computing device;

recording an update to the data access token on the record-keeping system, the update indicating the second computing device as having ownership of the data access token and recorded without providing access to the private data records to the second computing device;

receiving, from the second computing device, an access request that includes the at least one field of interest; and enabling, upon authentication and validation of the second computing device and according to another execution of the data access activation protocol, the second computing device to access the at least one value of the at least one field of interest from the at least one private database.

27. The at least one computer-readable, non-transitory memory of claim 26, wherein the operations further comprise:
  determining the homomorphic context from the data access activation protocol; and
  instantiating, based on the homomorphic context, the homomorphic workspace that is external to the computing device, wherein the computing device is enabled to interact with the at least one value stored via the homomorphic workspace.

28. The system of claim 1, wherein the data access token is recorded on the record-keeping system by at least using the data access token identifier as an index of the recording.

29. The system of claim 1, wherein the at least one processor performs further operations of:
  generating, upon access by the computing device of the at least one value of the at least one field of interest from the at least one private database, a record in the record-keeping system, the record indicating the access and indexed by at least using the data access token identifier.

* * * * *